United States Patent
Camenisch et al.

(10) Patent No.: US 12,063,308 B2
(45) Date of Patent: Aug. 13, 2024

(54) DISTRIBUTED NETWORK WITH BLINDED IDENTITIES

(71) Applicant: DFINITY STIFTUNG, Zürich (CH)

(72) Inventors: Jan Camenisch, Thalwil (CH); Dominic Williams, Palo Alto, CA (US); Andrea Cerulli, Zurich (CH); David Derler, Horgen (CH); Manu Drijvers, Zurich (CH); Timo Tobias Hanke, Zurich (CH); Gregory Neven, Oberrieden (CH)

(73) Assignee: DFINITY STIFTUNG, Zürich (CH)

( * ) Notice: Subject to any disclaimer, the term of this patent is extended or adjusted under 35 U.S.C. 154(b) by 321 days.

(21) Appl. No.: 17/441,161

(22) PCT Filed: Mar. 20, 2019

(86) PCT No.: PCT/EP2019/056970
§ 371 (c)(1),
(2) Date: Sep. 20, 2021

(87) PCT Pub. No.: WO2020/187413
PCT Pub. Date: Sep. 24, 2020

(65) Prior Publication Data
US 2022/0158842 A1 May 19, 2022

(51) Int. Cl.
*H04L 9/00* (2022.01)
*H04L 9/08* (2006.01)
*H04L 9/32* (2006.01)

(52) U.S. Cl.
CPC .......... *H04L 9/3239* (2013.01); *H04L 9/0825* (2013.01); *H04L 9/3218* (2013.01); *H04L 9/3255* (2013.01); *H04L 9/50* (2022.05)

(58) Field of Classification Search
CPC ... H04L 9/3239; H04L 9/0825; H04L 9/3218; H04L 9/3255; H04L 9/50
See application file for complete search history.

(56) References Cited

U.S. PATENT DOCUMENTS

2017/0345105 A1* 11/2017 Isaacson ................ G06Q 20/40
2018/0167198 A1*  6/2018 Muller .................... G06F 21/44
(Continued)

FOREIGN PATENT DOCUMENTS

EP          3257191           4/2018
WO     WO-2018076013 A1 *  4/2018  ............. H04L 63/00
(Continued)

OTHER PUBLICATIONS

"Nigel P. Smart", "Topics in Cryptology-CT-RSA 2018", "Apr. 2018" (Year: 2018).*
(Continued)

*Primary Examiner* — Darshan I Dhruv
(74) *Attorney, Agent, or Firm* — Mannava & Kang, P.C.

(57) ABSTRACT

According to an embodiment of a first aspect of the invention, there is a distributed network comprising a plurality of network nodes. Each of the plurality of network nodes is linked to a first node identity of a plurality of first node identities. Each of the plurality of first node identities comprises a first verification key of a public-key signature scheme. The distributed network is configured to perform a key shuffling step adapted to perform an unlinkable one-to-one mapping between the plurality of first node identities and a plurality of second node identities. Each of the plurality of second node identities comprises a second verification key of a public-key signature scheme. The distributed network is configured to perform a consensus protocol with a subset of the plurality of second node identities. Further aspects of the invention relate to a corresponding computer-implemented method, a network node and a computer program product.

21 Claims, 10 Drawing Sheets

(56) References Cited

U.S. PATENT DOCUMENTS

| | | | |
|---|---|---|---|
| 2019/0020468 A1* | 1/2019 | Rosenoer | H04L 9/3228 |
| 2019/0020629 A1* | 1/2019 | Baird, III | H04L 9/3297 |
| 2019/0028277 A1 | 1/2019 | Jayachandran | |
| 2019/0370793 A1* | 12/2019 | Zhu | H04L 9/50 |
| 2020/0026699 A1* | 1/2020 | Zhang | H04L 9/0643 |
| 2020/0175138 A1* | 6/2020 | Nordstrom | H04L 63/06 |
| 2020/0267002 A1* | 8/2020 | Yuan | H04L 9/3255 |
| 2021/0051031 A1* | 2/2021 | Zamani | H04L 9/3218 |

FOREIGN PATENT DOCUMENTS

| | | |
|---|---|---|
| WO | 2018189658 | 10/2018 |
| WO | 2019014337 A1 | 1/2019 |

OTHER PUBLICATIONS

European Patent Office, "International Search Report and Written Opinion, Application PCT/EP2019/056970 filed Mar. 20, 2019", mailed Dec. 11, 2019, 9 pages.

Arvind Narayanan, et al., "Bitcoin and Cryptocurrency Technologies", Feb. 9, 2016, 308 pages.

D. Chaum, "Untraceable Electronic Mail, Return Addresses, and Digital Pseudonyms", Communications of the ACM, Feb. 1981, vol. 24, No. 2, pp. 84-88.

E. Zhai et al., "AnonRep: Towards Tracking-Resistant Anonymous Reputation", The Proceedings of the 13th USENIX Symposium on Networked Systems Design and Implementation (NSDI'16), Mar. 2016, pp. 583-596.

L. S. Sankar et al., "Survey of Consensus Protocols on Blockchain Applications", 2017 International Conference on Advanced Computing and Communication Systems (ICACCS 2017), Jan. 2017, pp. 1-5.

Martin Florian et al., "Sybil-Resistant Pseudonymization and Pseudonym Change without Trusted Third Parties", WPES '15, Proceedings of the 14th ACM Workshop on Privacy in the Electronic Society, Oct. 2015, pp. 65-74.

Timo Hanke, et al., " DFINITY Technology Overview Series Consensus System", Technology Overviews, Jan. 23, 2018, 16 pages.

Alexandra Boldyreva, "Threshold Signatures, Multisignatures and Blind Signatures Based on the Gap-Diffie-Hellman-Group Signature Scheme", 2003, pp. 31-46.

Dan Boneh, et al., "Short Signatures from the Weil Pairing", Jul. 30, 2004, pp. 297-319.

David Pointcheval, et al., "Short Randomizable Signatures", Proceedings of the Cryptographers Track, Feb. 29-Mar. 4, 2016, San Francisco, CA, USA, 19 pages.

Rosario Gennaro, et al., "Secure Distributed Key Generation for Discrete-Log Based Cryptosystems", May 19, 2006, pp. 51-83.

* cited by examiner

DISTRIBUTED NETWORK WITH BLINDED IDENTITIES

TECHNICAL FIELD

The present invention pertains to a distributed network comprising a plurality of network nodes, in particular a blockchain network.

Further aspects relate to a method for performing a consensus protocol in a distributed network, a network node of a distributed network and a corresponding computer program product.

BACKGROUND ART

In distributed networks a plurality of network nodes are arranged in a distributed fashion. In distributed networks computing, software and data are spread out across the plurality of network nodes. The network nodes establish computing resources and the distributed networks may use distributed computing techniques.

An example of distributed networks are blockchain networks. Blockchain networks are consensus-based, electronic ledgers based on blocks. Each block comprises transactions and other information. Furthermore, each block contains a hash of the previous block so that blocks become chained together to create a permanent, unalterable record of all transactions which have been written to the blockchain. Transactions may contain small programs known as smart contracts.

In order for a transaction to be written to the blockchain, it must be "validated" by the network. In other words, the network nodes have to gain consent on blocks to be written to the blockchain. Such consent may be achieved by various consensus protocols.

One type of consensus protocols are proof-of-work consensus protocols. A proof-of-work consensus protocol generally requires some work from the parties that participate in the consensus protocol, usually corresponding to processing time by a computer. Proof-of-work-based cryptocurrency systems such as Bitcoin involve the solving of computationally intensive puzzles to validate transactions and to create new blocks.

Another type of consensus protocols are proof-of-stake-consensus protocols. Such proof-of-stake protocols have the advantage that they do not require time-consuming and energy-intensive computing. In proof-of-stake based blockchain networks e.g. the creator of the next block is chosen via combinations of random selection as well as the stake of the respective node in the network. The stake may be considered as the wealth of the node.

One important aspect of distributed networks, in particular of blockchain networks, is to maintain the security of the transactions and the associated digital assets.

Accordingly, there is a need for distributed networks with enhanced security.

DISCLOSURE OF THE INVENTION

Accordingly, one problem of an aspect of the invention is to provide a distributed network with enhanced security features.

According to an embodiment of a first aspect of the invention, there is provided a distributed network comprising a plurality of network nodes. Each of the plurality of network nodes is linked to a first node identity of a plurality of first node identities. Each of the plurality of first node identities comprises a first verification key of a public-key signature scheme. The distributed network is configured to perform a key shuffling step adapted to perform an unlinkable one-to-one mapping between the plurality of first node identities and a plurality of second node identities. Each of the plurality of second node identities comprises a second verification key of a public-key signature scheme. The distributed network is configured to perform one or more steps of a consensus protocol with a subset of the plurality of second node identities.

Such an embodied network provides two different identities to the plurality of network nodes, namely a first node identity and a second node identity. While the first node identity may be in particular identified by a first verification key corresponding to a first secret signature key, the second node identity may be in particular identified by a second verification key corresponding to a second secret signature key. The first and the second signature key may also be denoted as first secret key and second secret key respectively. The first and the second verification key may be also denoted as first public key and second public key respectively.

The key shuffling step performs on the one hand an unlinkable mapping between the plurality of first node identities and the plurality of second node identities, in particular between the first verification key (first public key) and the second verification key (second public key). This provides the advantage that an adversary cannot link any of the plurality of first node identities to the plurality of second node identities. According to embodiments of the invention, the link between any of the plurality of first node identities and the corresponding second node identities is hidden or in other words blinded or in other words anonymous. Hence the second node identities may be considered as blinded node identities or anonymous node identities.

The key shuffling step performs on the other hand a one-to-one mapping between the plurality of first node identities and the plurality of second node identities. Such a one-to-one mapping provides the advantage that each of the first node identities may only get one single second node identity. This provides resistance against Sybil-attacks.

The key shuffling step may be in particular embodied as key shuffling protocol and may comprise a plurality of sub-steps.

Hence embodiments of the invention may hide the identity of the participants of the consensus protocol and the consensus protocol may be performed in an anonymous or blinded way by the subset of the second node identities.

This improves the security of the network, in particular against adaptive corruption attacks.

Such adaptive corruption attacks may aim at exploiting knowledge about privileged roles of the plurality of first node identities. As an example, there are consensus algorithms that assign privileged roles to selected nodes of the network, e.g. based on a stake in the network. Such privileged roles may then provide a higher weight in the consensus protocol and an adversary may aim at gaining control of the network by corrupting in particular the privileged nodes.

Hence such adaptive corruption attacks may be avoided according to embodiments of the invention in an efficient and elegant way.

A consensus protocol according to embodiments of the invention may be generally any process according to which the network nodes have to agree on some data or data value. This may include whether to commit a transaction to a database, agreeing on the identity of a leader, opinion formation etc. According to embodiments the consensus protocol may be in particular a proof-of-stake consensus protocol of a blockchain network.

According to embodiments of the invention the consensus protocol may comprise a plurality of steps.

According to some embodiments, the second node identities may be used only for a part of the consensus protocol, i.e. only for a subset of the plurality of steps.

According to other embodiments, the second node identities may be used for the whole consensus protocol, i.e. for all of the plurality of steps of the consensus protocol.

According to embodiments, the network performs the consensus protocol with a subset of the plurality of the second node identities. The term subset shall mean that the consensus protocol may be performed with all of the plurality of second node identities or with not all of the plurality of second node identities, the latter establishing a proper or strict subset.

According to embodiments, the network is further configured to regularly repeat the key shuffling step.

This provides a regular update of the second node identities and hence further impedes attacks of an adversary. The regular repeat may be performed at regular time intervals. The regular time intervals may be denoted as epochs according to embodiments.

According to embodiments, the network is further configured to perform an identity revealing step. The identity revealing step reveals the mapping between the plurality of first node identities and the plurality of second node identities after performing/having performed the consensus protocol.

This revealing step may further increase the security of the network. In particular, it may be used to assign rewards or penalizations to the first node identities corresponding to the revealed second node identities. Such rewards or penalizations may be e.g. assigned for nodes that behave well or that misbehave during the consensus protocol. In addition, nodes that do not reveal their identity during the revealing step may be assumed to be a misbehaving node.

According to embodiments, the network is further configured to perform a further key shuffling step adapted to perform an unlinkable one-to-one mapping between the plurality of second node identities and a plurality of third node identities, wherein each of the plurality of third node identities comprises a third verification key corresponding to a third secret signature key of a public-key signature scheme.

Such an additional key shuffling step from the already anonymized or in other words blinded second node identities further impedes attacks of an adversary.

According to embodiments, the network is a blockchain network, in particular a proof-of-stake blockchain network. In such a proof-of stake network the plurality of first node identities may be in particular permanent node identities. Each of the plurality of permanent node identities comprises as first verification key a permanent verification key and as first signature key a permanent signature key. Furthermore, the plurality of second node identities may be in particular a plurality of blinded node identities and each of the plurality of blinded node identities comprises as second verification key a blinded verification key and as second signature key a blinded signature key.

According to embodiments, permanent node identities are identities that are linked permanently to the respective network node. In the context of this disclosure the term "permanent" shall not necessarily mean forever, but rather long-term. Long-term in this respect shall mean according to embodiments that the permanent link is used or valid for at least a predefined time period. The predefined time period is in particular significantly longer than the time interval of the repeat of the key shuffling step. According to embodiments, the predefined time period may be set e.g. to 1 year, 6 months or 1 month. Hence a permanent node identity shall be in particular an identity that is linked at least long-term to a network node.

The term "blinded" shall mean that the link between the permanent node identity and the blinded node identity is not public, is hidden or in other words is anonymous. More particularly, only the respective permanent node that is linked to the corresponding blinded node identity knows this link, while all the other permanent node identities and the "public" do not know it.

The nodes in the network are expected to participate in a consensus protocol. A blinded node identity shall mean according to embodiments that the respective node may participate with its corresponding blinded node identity as identity in the consensus protocol. Hence a blinded node identity may also be denoted as consensus identity, i.e. an identity that is used in the consensus protocol.

According to embodiments, the network is configured to perform as consensus protocol a proof-of-stake consensus protocol on transactions to be written on the blockchain network with a subset of the plurality of blinded node identities.

The proof-of-stake consensus protocol aims at reaching a consensus on the next block of transactions that shall be written on or to the blockchain.

Hence according to such an embodiment the proof-of-stake consensus protocol may be performed in an anonymous way which makes it more difficult for an adversary to perform adaptive corruption attacks, i.e. to aim at corrupting nodes that have been elected into a privileged role.

According to embodiments of the invention the consensus protocol may encompass e.g. a step of electing a committee that is entitled to notarize new blocks, a step of ranking new block proposer as well as a step of computing a next randomness value, e.g. of a random beacon.

According to some embodiments, the second node identities may be used for all of the three steps mentioned above, while according to other embodiments, the second node identities may be used only for one or for two of the above mentioned steps.

According to embodiments, each of the plurality of network nodes comprises a stake identity. The stake identity comprises a stake verification key corresponding to a stake signature key of a public-key signature scheme. The network is further configured to certify the first node identities, in particular the permanent node identities, by the corresponding stake identities.

The stake identity may be in particular associated to a stake deposit of the respective network node. Any transactions for the deposit have to be authenticated with the stake signature key corresponding to the stake verification key.

Such a separation of the permanent node identities from the stake identities allows stake holders to "rent out" their stake e.g. to a data center, e.g. by handing over the permanent signature key (secret key) corresponding to the permanent verification key (public key) or by certifying a permanent verification key provided by the data center.

This allows the stake owner and the data center to share rewards for the stake, without having to hand over the stake itself. Renting out stake improves the overall security of the system by increasing the amount of stake that is deposited for participation in the consensus protocol, and hence the amount of stake that an adversary would have to corrupt to take control of the network.

According to embodiments, the stake verification key may be in particular a Schnorr public key.

According to embodiments, the network is further configured to assign a network identity to each of the plurality of permanent node identities and to certify the network identity by the corresponding permanent node identity.

This links the permanent node identities to a network identity. The certification may be performed with the permanent signature key corresponding to the permanent verification key. The network identity may comprise in particular a Transport Layer Security ("TLS") certificate and a network address such as an Internet Protocol ("IP") address.

According to another embodiment, the network is configured to perform an unlinkable one-to-one mapping between the plurality of blinded node identities and a plurality of blinded network identities. Each of the plurality of blinded network identities comprises a network verification key and a network signature key. The network verification key and the network signature key may be in particular keys of a public-key signature and encryption scheme such as RSA.

Such an embodiment provides blinded or anonymous network identities and allows to hide the network location of the nodes that participate in the consensus protocol. This may be used in particular to hide how much stake is behind a particular network (IP) address. Furthermore, this may avoid to be targeted in corruption or Distributed Denial of Service (DDoS) attacks.

According to another embodiment, the network is configured to perform an unlinkable one-to-one mapping between the plurality of permanent node identities and a plurality of blinded network identities. Each of the plurality of blinded network identities comprises a network verification key and a network signature key. The network verification key and the network signature key may be in particular keys of a public-key signature scheme such as Schnorr and an encryption scheme such as ElGamal.

Such an embodiment also provides blinded or anonymous network identities and may be used as alternative to the above mentioned embodiment. It also allows to hide the network location of the nodes that participate in the consensus protocol. This may be used in particular to hide how much stake is behind a particular network (IP) address. Furthermore, this may also avoid to be targeted in corruption or DDoS attacks.

Networks according to embodiments of the invention may be in particular configured to perform a gossip protocol to disseminate information between the network nodes. According to embodiments a plurality of different gossip protocols may be used. According to embodiments, a gossip protocol may be defined as a method of computer peer-to-peer communication that is similar to the way how epidemics spread.

Embodiments of the invention may use in particular peer-to-peer gossip protocols to ensure that data is routed to all network nodes of the distributed network.

Networks with blinded network identities according to embodiments of the invention may be configured to assign the plurality of blinded network identities to a plurality of vertices of a gossip graph so that each vertex can look up a network verification key (network public key) of its neighbours.

This may ensure that each network node of the network knows its corresponding neighbour nodes and may communicate with them. According to embodiments, each vertex of the gossip graph is configured to encrypt its network-address, in particular its Internet Protocol (IP)address, with the network verification key (network public key) of its neighbours. In addition, each vertex may sign the encrypted network (IP)-address with its network signature key and provide the signed and encrypted network (IP)address to its neighbours. The neighbours may then decrypt the encrypted network address with the secret key corresponding to the verification key (public key) and verify the signature of the network signature key with the corresponding network verification key.

According to embodiments, the gossip-graph may be in particular a d-regular graph, wherein d denotes the numbers of neighbours of each vertex of the gossip graph.

According to embodiments, each node of the network may forward all messages that it has received to its neighbours. According to embodiments, additional efficiency measures may be implemented. As an example, a node may forward at first only hashes of the message it has received to its neighbours so that the neighbours can check whether they have received the corresponding message already. This may reduce redundant network traffic.

According to embodiments, the network is further configured to elect members of a committee from the plurality of second node identities according to a predefined election scheme and to perform the consensus protocol with the elected members of the committee.

Such a network may achieve a high transaction rate and short finalization time as the committee may be significantly smaller than the full set of network nodes. While a complete network may comprise tens of thousands of network nodes, the committee may only comprise hundreds of nodes as an example. Hence the committee can act more efficiently than if all nodes in the system would be involved. Such a committee may also be denoted as notarization committee as it is entitled to notarize blocks.

According to embodiments the size of the committee is decided by a statistical argument showing that an adversary controlling at most a fraction x of the total stake will control at most a fraction y>x of the randomly selected nodes in a committee.

According to embodiments, the network may be then designed such that it remains secure when at most y of the nodes within all committees are corrupt, which translates into a security guarantee as long as at most x of the overall stake is corrupt.

One problem with this argument is that it may not hold against adaptive corruptions: if the adversary can wait with corrupting nodes until after they are elected into privileged roles such as a notarization committee or high-ranked block proposers, then the adversary can gain control of the network while controlling only a tiny fraction of the stake.

Embodiments of the invention provide countermeasures against such attacks, in particular by blinding the link between the permanent node identity and the blinded node identity.

The predefined election scheme may be embodied in various ways.

According to some embodiments a threshold relay scheme may be used. More particularly, networks according to embodiments of the invention may use a threshold relay, a distributed random beacon that is maintained by subsequent notarization committees of randomly selected nodes. The output of the random beacon is used as entropy in the system, e.g., for ranking block proposers and for composing new generations of committees. Such a threshold relay scheme is described e.g. in the document by Timo Hanke, Mahnush Movahedi and Dominic Williams, DFINITY Technology Overview Series, Consensus System, Rev.1, https://dfinity.org/static/dfinity-consensus0325c35128c72b42df7dd30c22c41208.pdf As mentioned above, the blinding may be used according to embodiments only for a part of the consensus protocol. According to some embodiments, the blinded node identities may only be used for the computation of the random beacon.

According to embodiments, the elected members of the committee may perform a distributed key generation protocol.

With such a distributed key generation protocol the elected members of the committee agree on a signature key for the next transaction or in other words a transaction key. Such a signature key may be in particular a threshold signature key.

Embodiments of the invention break the link between the permanent node identities and the network identities. While the permanent node identities may be used e.g. for an election into a committee, for rankings as block proposer and/or for signing messages in those roles, the network identities may be used for an assignment to vertices in the gossip graph and the protection of point-to-point connections with neighbors.

According to embodiments, the plurality of second node identities are assigned to a plurality of shards. A shard may be considered as a subset of the network nodes.

The key shuffling step may be embodied in various ways. According to embodiments, techniques that may be used involve blind signatures, threshold Pointcheval-Sanders signatures, OR-proofs and iterated OR-proofs.

According to an embodiment, the key shuffling step is based on mixing techniques. More particularly, the key shuffling step comprises electing, by the plurality of first node identities, a plurality of mixers as a subset of the first node identities. The plurality of mixers is arranged at a specified or predefined order, e.g. in the form of an ordered list. The key shuffling step further comprises receiving, by each mixer, an input list comprising a plurality of verification keys and computing, by each mixer, an output list comprising a permutation and re-randomization of the input list. The computing may use in particular a secret permutation and a secret re-randomization exponent. The first mixer of the specified order receives as input list the first verification keys of the plurality of first node identities, in particular the permanent verification keys of the plurality of permanent node identities. Each subsequent mixer receives as input list the output list of the previous mixer. The output list of the last mixer of the specified order establishes the plurality of second node identities, in particular the plurality of blinded node identities.

Such a mixing-based key shuffle provides in particular the advantage that at the end of mixing the plurality of second node identities are publicly available. This makes DOD-attacks difficult.

According to embodiments, the network may be further configured to perform a further key-shuffling step which comprises a step of electing, by the plurality of second node identities, in particular by the plurality of blinded node identities, a plurality of mixers as a subset of the second node identities.

Hence, according to such an embodiment the first key shuffling/mixing step is performed from the first, in particular the permanent node identities, while the further key shuffling/mixing step uses the second, in particular the blinded node identities of the previous key shuffling step as input.

According to embodiments, the key shuffling step further comprises computing, by each mixer, a zero-knowledge proof proving that the re-randomization and the permutation has been computed correctly.

According to embodiments, the key shuffling step further comprises adding, by each mixer, the zero knowledge proof to the output list.

According to embodiments the soundness of the proof guarantees that it is unfeasible for a misbehaving mixer to compute an accepting proof.

The plurality of mixers comprises a predefined minimum number of mixers. The minimum number of mixers may be e.g. 20, 50 or 100.

The predefined minimum number is chosen such that it may be assumed with sufficient probability that at least one of the mixers is honest.

According to an embodiment of another aspect of the invention, a computer-implemented method for performing a consensus protocol in a distributed network is provided. The method comprises steps of linking each of the plurality of network nodes to a first node identity of a plurality of first node identities, wherein each of the plurality of first node identities comprises a first verification key and a first signature key. The method comprises a further step of performing a key shuffling step comprising performing an unlinkable one-to-one mapping between the plurality of first node identities and a plurality of second node identities, wherein each of the plurality of second node identities comprises a second verification key and a second signature key. The method comprises a further step of performing the consensus protocol, in particular the proof-of-stake consensus protocol, with a subset of the plurality of second node identities.

According to an embodiment of another aspect of the invention, a network node of a distributed network, in particular of a proof-of-stake blockchain network, is provided. The network node is linked, in particular permanently linked, to a first node identity. The first node identity comprises a first verification key and a first signature key. The network node is configured to participate in a key shuffling step or key shuffling protocol adapted to perform an unlinkable one-to-one mapping between the first node identity of the network node and a second node identity. The second node identity comprises a second verification key and a second signature key. The network node is further configured to participate in a consensus protocol, in particular a proof-of-stake consensus protocol, with the second node identity.

According to an embodiment of another aspect of the invention, a computer program product for operating a distributed network, in particular a proof-of-stake blockchain network, is provided. The computer program product comprises a computer readable storage medium having program instructions embodied therewith, the program instructions executable by one or more of the plurality of network nodes to cause the one or more of the plurality of network nodes to perform a method comprising linking each of the plurality of network nodes to a first node identity of a plurality of first node identities, wherein each of the plurality of first node identities comprises a first verification key and a first signature key. The method further comprises performing a key shuffling step comprising performing an unlinkable one-to-one mapping between the plurality of first node identities and a plurality of second node identities, wherein each of the plurality of second node identities comprises a second verification key and a second signature key. The method further comprises performing the consensus protocol, in particular the proof-of-stake consensus protocol, with a subset of the plurality of second node identities.

According to an embodiment of another aspect of the invention, a software architecture encoded on a non-transitory computer readable medium is provided. The software architecture is configured to operate one or more network nodes of a distributed network. The encoded software architecture comprises program instructions executable by one or more of the plurality of network nodes to cause the one or more of the plurality of network nodes to perform a method comprising linking each of the plurality of network nodes to a first node identity of a plurality of first node identities, wherein each of the plurality of first node identities comprises a first verification key. The method further comprises performing a key shuffling step comprising performing an unlinkable one-to-one mapping between the plurality of first node identities and a plurality of second node identities, wherein each of the plurality of second node identities comprises a second verification key. The method comprises a further step of performing the consensus protocol, in particular the proof-of-stake consensus protocol, with a subset of the plurality of second node identities.

Features and advantages of one aspect of the invention may be applied to the other aspects of the invention as appropriate.

Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description makes reference to the annexed drawings, wherein.

MODES FOR CARRYING OUT THE INVENTION

At first, some general aspects and terms of embodiments of the invention will be introduced.

According to embodiments, a distributed network comprises a plurality of network nodes that are arranged in a distributed fashion. In such a distributed network computing, software and data is distributed across the plurality of network nodes. The network nodes establish computing resources and the distributed network may use in particular distributed computing techniques.

According to embodiments, distributed networks may be in particular embodied as blockchain networks. The term "blockchain" shall include all forms of electronic, computer-based, distributed ledgers. According to some embodiments, the blockchain network may be embodied as proof-of-work blockchain network. According to other embodiments, the blockchain network may be embodied as proof-of-stake blockchain network.

Figure 1:
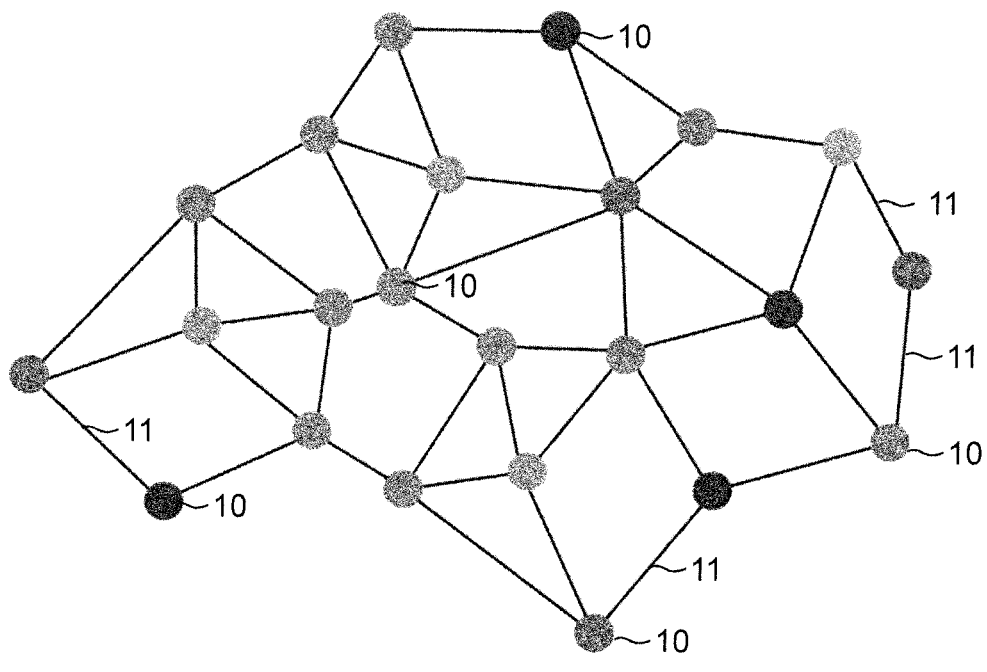
FIG. 1 shows an exemplary block diagram of a distributed network according to an embodiment of the invention.

FIG. 1 shows an exemplary block diagram of a distributed network 100 according to an embodiment of the invention.

The distributed network 100 comprises a plurality of network nodes 10. The plurality of network nodes 10 are coupled or connected to neighbouring nodes 10 via communication links 11, which may also be denoted as edges 11. The plurality of network nodes 10 may communicate with their neighbours via the communications links 11, in particular by means of a gossip protocol. The network 100 may be in particular a proof-of-stake blockchain network.

Proof-of-stake (PoS) describes a method by which a blockchain network reaches distributed consensus about which node is allowed to create the next block of the blockchain. PoS-methods may use a weighted random selection, whereby the weights of the individual nodes may be determined in particular in dependence on the assets (the "stake") of the respective node.

According to embodiments, each network node of the distributed network may be associated with a fixed amount of stake. Accordingly, a party controlling more stake may simply control more node identities.

Figure 2:
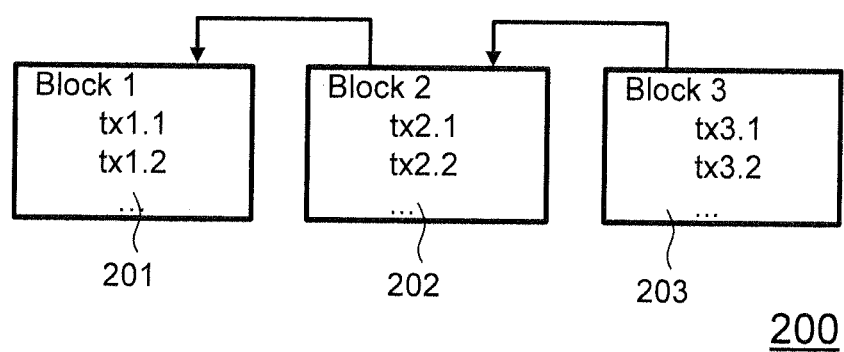
FIG. 2 illustrates the creation of blocks in the distributed network according to an exemplary embodiment of the invention.

FIG. 2 illustrates the creation of blocks in the distributed network 100 according to an exemplary embodiment of the invention. In this exemplary embodiment three blocks 201, 202 and 203 are illustrated. Block 201 comprises a plurality of transactions, namely the transactions tx1.1, tx1.2 and possibly further transactions indicated with dots. Block 202 comprises also a plurality of transactions, namely the transactions tx2.1, tx2.2 and possibly further transactions indicated with dots. Block 203 also comprises a plurality of transactions, namely the transactions tx3.1, tx3.2 and possibly further transactions indicated with dots. The blocks 201, 202 and 203 are chained together. More particularly, each of the blocks comprises a block hash of the previous block. This cryptographically ties the current block to the previous block(s).

Figure 3:
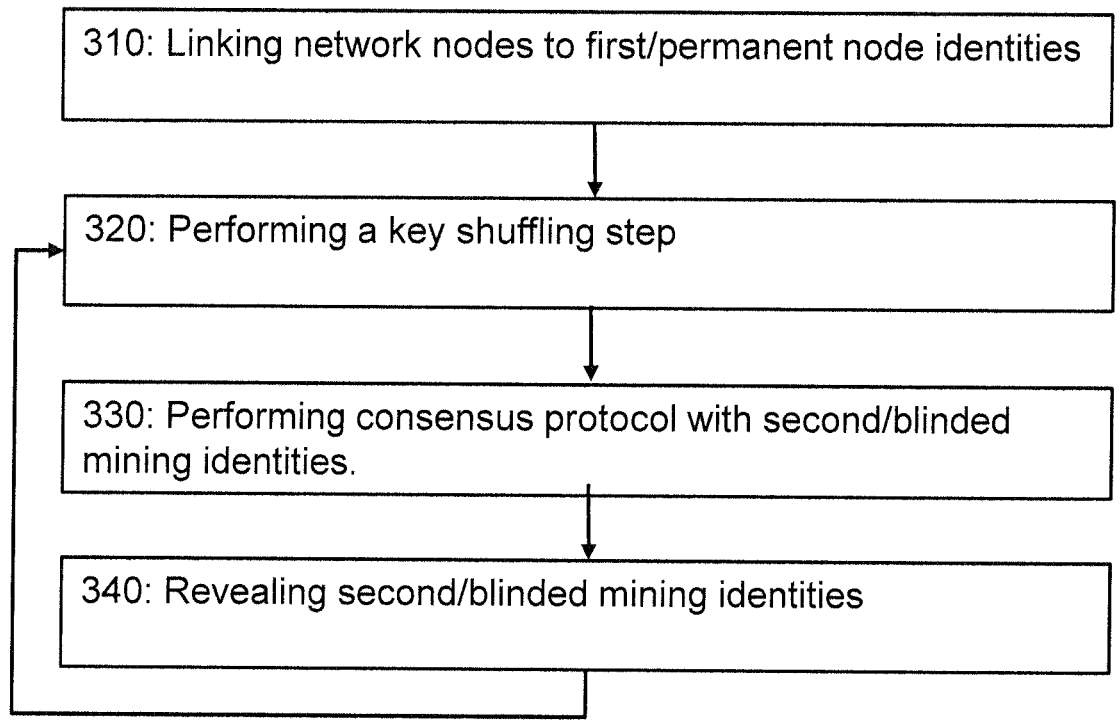
FIG. 3 shows a flow chart comprising method steps of a computer-implemented method for performing a consensus protocol in a distributed network.

FIG. 3 shows a flow chart 300 comprising method steps of a computer-implemented method for performing a consensus protocol in a distributed network, e.g. in the distributed network 100 of FIG. 1.

At a step 310, the distributed network 100 links each of the plurality of network nodes 10 to a first node identity of a plurality of first node identities, in particular to a permanent node identity of a plurality of permanent node identities. Each of the plurality of first node identities comprises a first verification key and a first signature key of a public-key signature scheme, in particular a permanent verification key and a permanent signature key.

At a step 320, the distributed network 100 performs a key shuffling step. The key shuffling step comprises performing an unlinkable one-to-one mapping between the plurality of first node identities and a plurality of second node identities. Each of the plurality of second node identities comprises a second verification key and a second signature key, in particular a blinded verification key and a blinded signature key of a public-key signature scheme.

At a step 330, which may be denoted as consensus step 330, the distributed network 100 performs the consensus protocol with a subset of the plurality of second node identities, in particular with a subset of the blinded node identities. The consensus protocol may be in particular a proof-of-stake consensus protocol on transactions to be written on the distributed network 100.

At a step 340, which may be denoted as revealing step 340, the nodes 10 of the distributed network 100 reveal their second node identities, in particular their blinded node identities.

According to embodiments, the key shuffling step 320, the consensus step 330 and the revealing step 340 are repeated, in particular regularly repeated.

The method steps may be in particular performed in a subsequent order during subsequent epochs.

Figure 4:
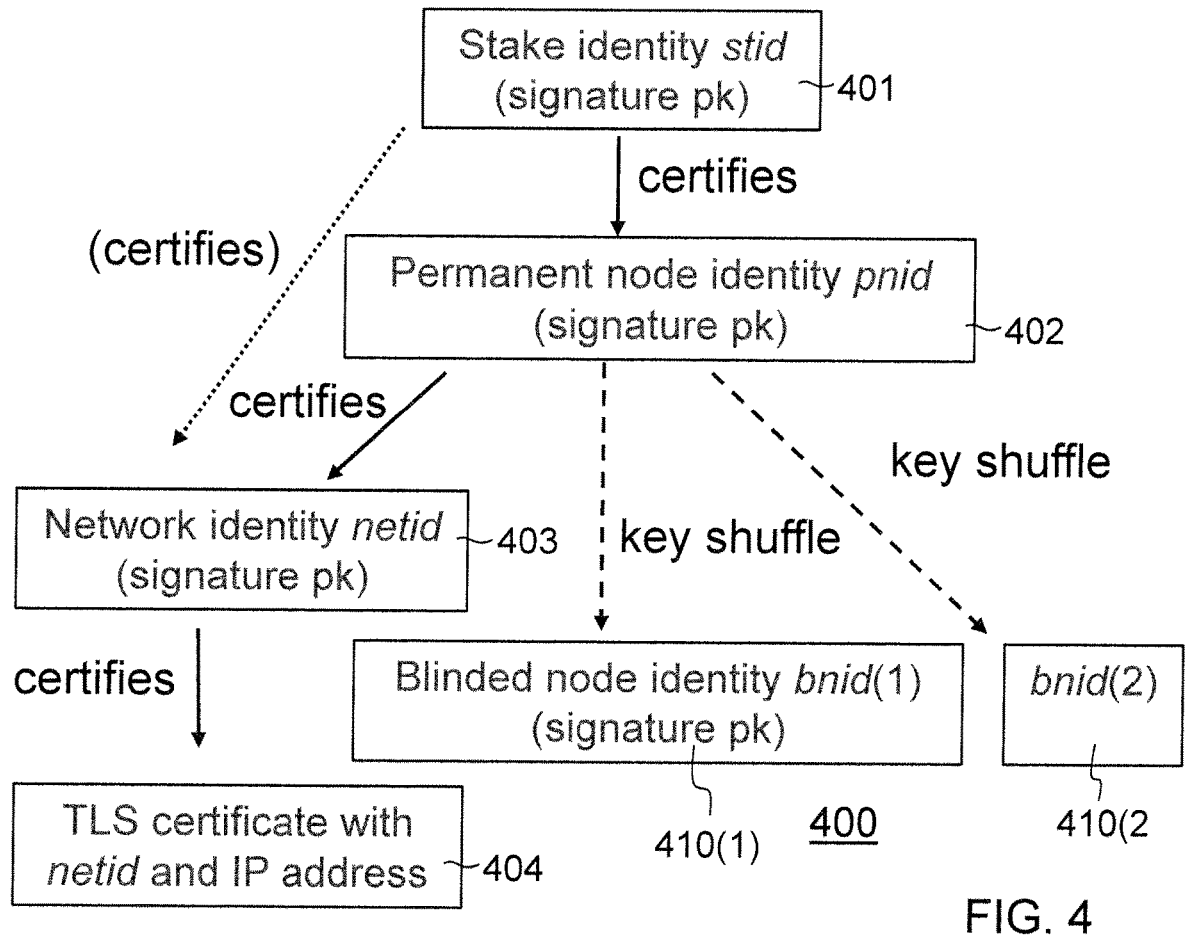
FIG. 4 shows a node identity structure of network nodes of a network according to an embodiment of the invention.

FIG. 4 shows a node identity structure of network nodes of a network according to an embodiment of the invention, e.g. of the network 100 as shown in FIG. 1.

Each of the plurality of network nodes 10 comprises a stake identity stid, 401. The stake identity stid, 401 comprises a stake verification key $pk_{stid}$ and a stake signature key $sk_{stid}$ of a public-key signature scheme.

The network 100 is configured to certify permanent node identities 402, of the respective nodes 10 by the corresponding stake identities stid, 401. The permanent node identities 402 may be in the following also denoted as permanent node identities pnid. The permanent node identities 402, pnid comprise a permanent verification key $pk_{perm}$ and a permanent signature key $sk_{perm}$ of a public-key signature scheme.

The stake verification key $pk_{stid}$ may be in particular a Schnorr public key.

The network 100 is further configured to assign a network identity netid, 403 to each of the plurality of permanent node identities.

According to one embodiment, as illustrated by a full arrow, the network identity netid, 403 may be certified by the corresponding permanent node identity pnid, 402. The network identity netid, 403 comprises a network verification key $pk_{netid}$ and a network signature key $sk_{netid}$ of a public-key signature scheme.

According to another embodiment, as illustrated by a dotted arrow, the network identity netid, 403 may be certified by the corresponding stake identity stid, 401.

The network identity netid, 403 certifies a TLS certificate 404 according to the Transport Layer Security standard. The TLS certificate comprises as network identity netid the network verification key $pk_{netid}$ and a network address, in particular an Internet Protocol (IP) address.

The network 100 is configured to perform a key shuffling step in order to create blinded node identities.

The key shuffling step takes as input all the permanent node identities pnid, 402 of all the nodes 10 of the network 100 and performs an unlinkable one-to-one mapping between the permanent node identities pnid, 402 and a corresponding number of blinded node identities 410, bnid. Each of the blinded node identities bnid comprises a blinded verification key $pk_{bnid}$ and a blinded signature key $sk_{bnid}$ of a public-key signature scheme.

The key shuffling step may be regularly repeated, e.g. at regular time intervals.

In the example of FIG. 4, two key shuffling steps are shown. A first key shuffling step has generated blinded node identities 410(1), bnid(1) and a second key shuffling step has generated blinded node identities 410(2), bnid(2).

Figure 5:
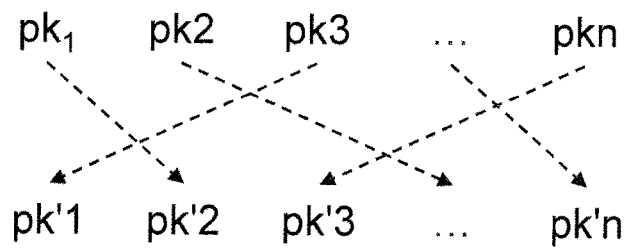
FIG. 5 illustrates an exemplary example of a key shuffling step according to embodiments of the invention.

FIG. 5 illustrates an exemplary example of a key shuffling step according to embodiments of the invention.

The key shuffling step receives as input a plurality of n first verification keys (public keys) $pk_1, pk_2, \ldots, pk_n$. The first verification keys (public keys) $pk_1, pk_2, \ldots, pk_n$ may be in particular embodied as permanent verification keys of permanent node identities.

The key shuffling step produces as output a plurality of n second verification keys (public keys) $pk_1', pk_2', \ldots, pk_n'$. The verification keys (public keys) $pk_1', pk_2', \ldots, pk_n'$ may be in particular embodied as blinded verification keys of blinded node identities.

The key shuffling step performs a mapping between the plurality of n first verification keys $pk_1, pk_2, \ldots, pk_n$ and the plurality of n second verification keys $pk_1', pk_2', \ldots, pk_n'$ that is firstly unlinkable. This means that the respective links between the first verification keys and the second verification keys as illustrated by the dotted arrows are blinded or in other words anonymous and only known to the respective owner of the respective first verification key. Furthermore, the mapping is a one-to-one mapping, i.e. each of the n first verification keys $pk_1, pk_2, \ldots, pk_n$ is mapped only to a single one of the n second verification keys $pk_1', pk_2', \ldots, pk_n'$.

Figure 6:
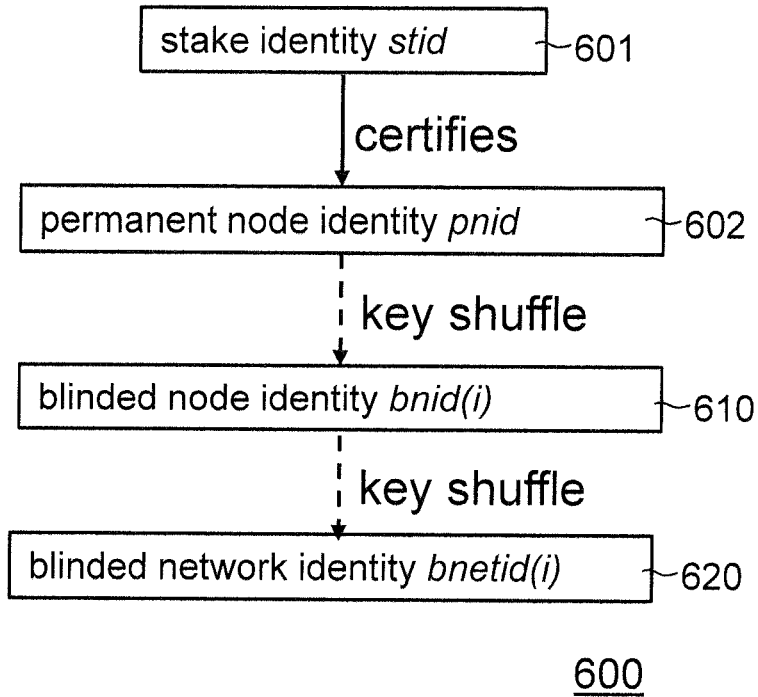
FIG. 6 shows a node identity structure of network nodes of a network according to another embodiment of the invention.

FIG. 6 shows a node identity structure 600 of network nodes of a network according to an embodiment of the invention, e.g. of the network 100 as shown in FIG. 1.

Each of the plurality of network nodes 10 comprises a stake identity stid, 601. The stake identity stid, 601 comprises a stake verification key $pk_{stid}$ and a stake signature key $sk_{stid}$ of a public-key signature scheme.

The network 100 is configured to certify permanent node identities 602, pnid of the respective nodes 10 by the corresponding stake identities stid, 601. The permanent node identities 602, pnid comprise a permanent verification key $pk_{perm}$ and a permanent signature key $sk_{perm}$ of a public-key signature scheme.

The network 100 is configured to perform a key shuffling step in order to create blinded node identities bnid (i).

The key shuffling step takes as input all the permanent node identities pnid, 602 of all the nodes 10 of the network 100 and performs an unlinkable one-to-one mapping between the permanent node identities pnid, 602 and a corresponding number of blinded node identities 610, bnid. Each of the blinded node identities 610, bnid comprises a blinded verification key $pk_{bnid}$ and a blinded signature key $sk_{bnid}$ of a public-key signature scheme.

The network having the node identity structure of FIG. 6 performs as another key shuffling step an unlinkable one-to-one mapping between the plurality of blinded node identities 610, bnid and a plurality of blinded network identities 620, bnetid. Each of the plurality of blinded network identities 620, bnetid comprises a blinded network verification key $pk_{bnetid}$ and a blinded network signature key $sk_{bnetid}$. According to embodiments, the blinded network verification key $pk_{bnetid}$ and the blinded network signature key $sk_{bnetid}$ are keys of a public-key signature and encryption scheme, such as e.g. RSA. This allows to use the blinded network verification key/signature key pair for signing as well as encryption.

After performing the key shuffle step, all blinded network identities bnetid may be assigned to a vertex of a gossip graph, so that each node can look up the bnetids of its neighbors. If a node i with blinded network identity $bnetid_i$ has a gossip neighbor j with blinded network identity $bnetid_j$, then node i computes the ciphertext $$c_{i,j} \leftarrow Enc(bnetid_j(IP_i)),$$

signs it with $bnetid_i$, and posts the signed ciphertext on the chain. IP denotes the Internet Protocol address. Node j may then verify its neighbor's signature and decrypt the ciphertext to recover its neighbor's IP address.

One advantage to generate blinded network identities is that network nodes may be assigned to shards based on their blinded node identity. By shuffling only the blinded node identity assigned to a specific shard, one obtains network identities for just the nodes assigned to that shard, without having to know which permanent node identities are assigned to the shard.

Figure 7:
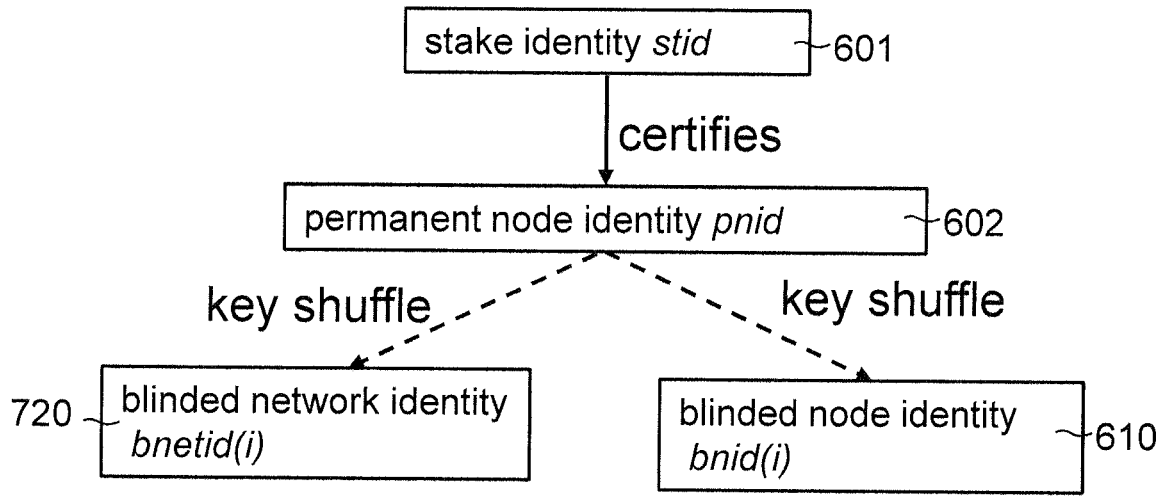
FIG. 7 shows a node identity structure of network nodes of a network according to an embodiment of the invention.

FIG. 7 shows a node identity structure 700 of network nodes of a network according to an embodiment of the invention, e.g. of the network 100 as shown in FIG. 1.

The node identity structure corresponds partly to the node identity structure 600 of FIG. 6 and comprises accordingly a stake identity stid, 601, a permanent node identity 602, pnid and blinded node identities bnid 610.

However, in contrast to the node identity structure of FIG. 6, the node identity structure of FIG. 7 performs as another key shuffle step an unlinkable one-to-one mapping between the plurality of permanent node identities 610, pnid and a plurality of blinded network identities 720, bnetid.

Figure 8:
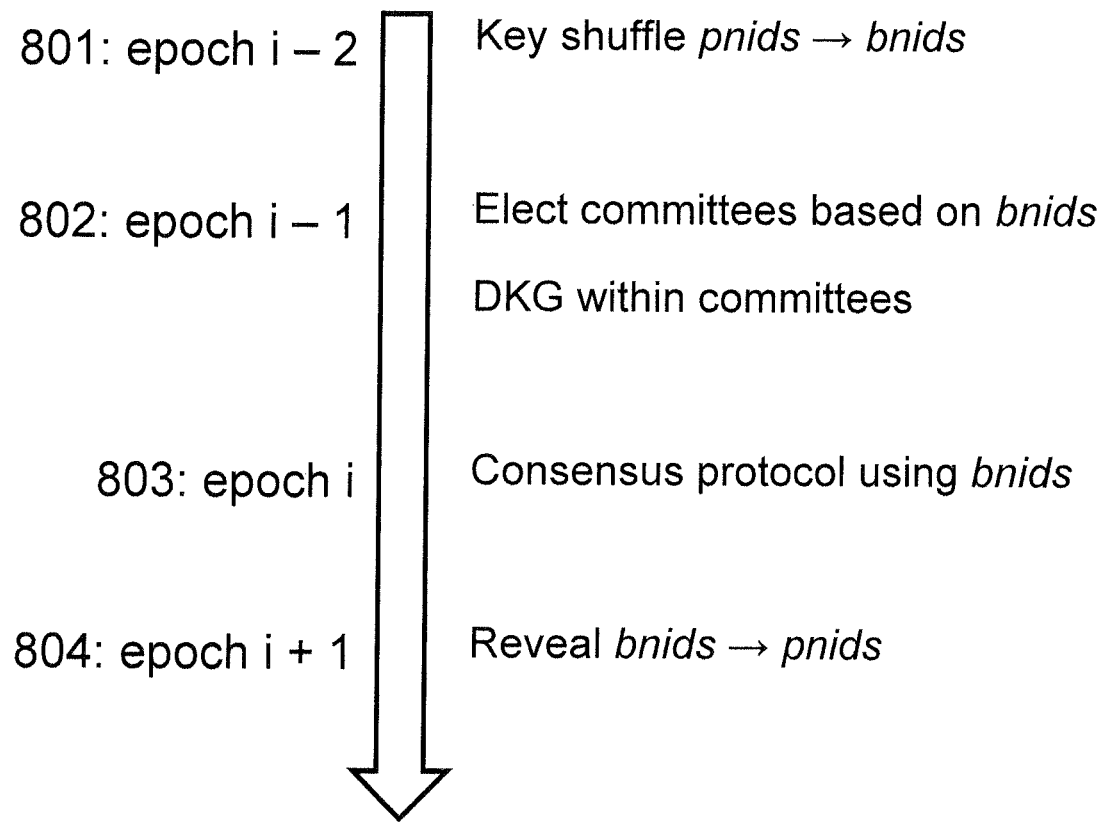
FIG. 8 shows a time diagram of the key shuffling and revealing steps according to another embodiment of the invention.

FIG. 8 shows a time diagram or in other words a timeline of the key shuffling and revealing steps according to an embodiment of the invention.

At a step 801, corresponding to an epoch i−2, blind node identities bnids are generated through an execution of the key shuffle protocol, using the permanent node identities pnids as input.

At a step 802, in epoch i−1, members of a committee are elected, e.g. by the use of a random beacon. This partitions the blinded node identities bnids into committees: The members of the committees perform a distributed key generation (DKG) protocol to determine their transaction keys.

At a step 803, corresponding to the epoch i, the members of the committee perform the consensus protocol with the blinded node identities bnids.

At a step 804, corresponding to an epoch i+1, all nodes reveal the link between their permanent node identity pnid and their blind identity bnid. Any rewards or penalizations that a bnid accumulated during epoch i can then be applied to the corresponding permanent node identity pnid or to the stake identity stid. Any node that fails to reveal its blind node identity is assumed to be part of the misbehaving nodes and may be penalized accordingly, e.g., by applying the maximum penalization that was acquired by any bnid(i) during the previous epoch.

According to embodiments, if the stake of a node that misbehaved in epoch i is taken away entirely, then that node may still be participating in the consensus protocol until epoch i+2, because its permanent node identity pnid can only be removed from the input of the key shuffle for bnid(i+3). However, it will be excluded from any consensus activities after epoch i+2.

According to embodiments of the invention there may be used a plurality of protocols for performing the key shuffling step. In the following FIGS. 7 to 9 some preferred protocols according to embodiments of the invention will be described in more detail.

Figure 9:
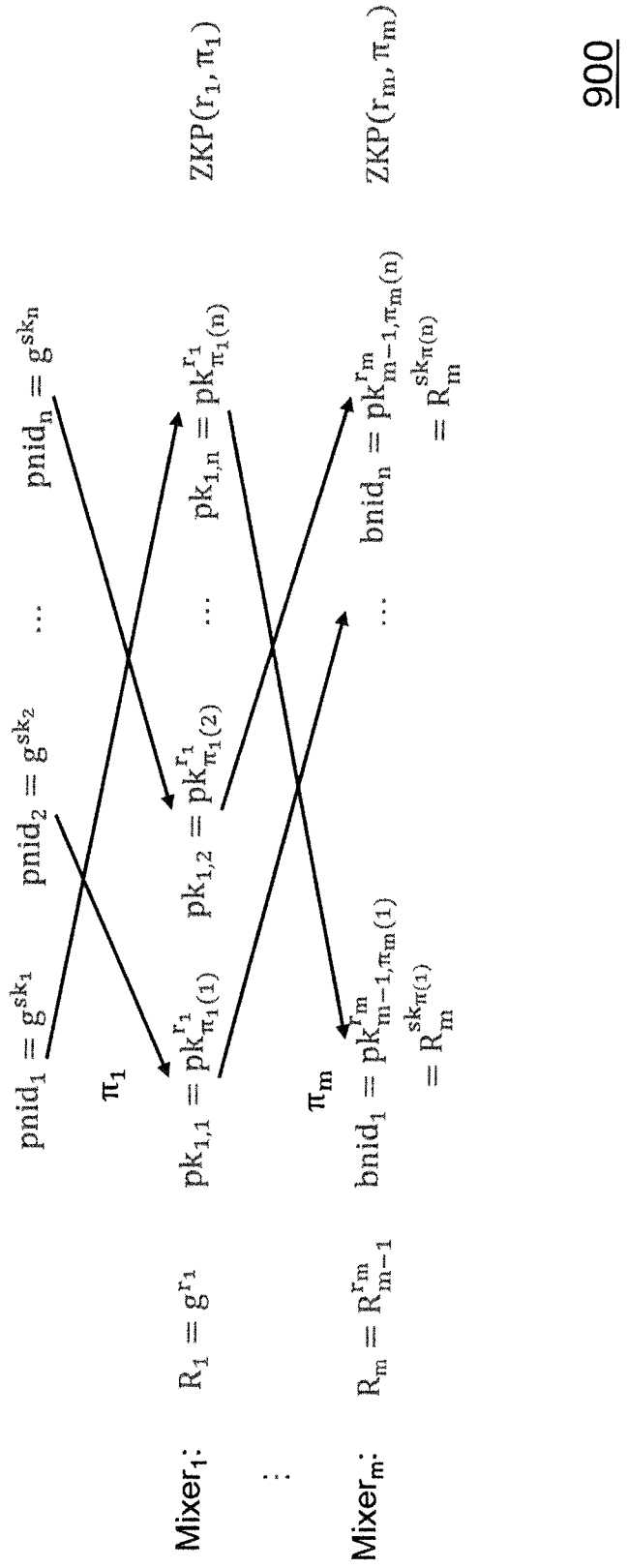
FIG. 9 shows a high-level illustration of a protocol for performing the key shuffling step according to an embodiment of the invention using a cryptographic mix network.

FIG. 9 illustrates on a high level a protocol for performing the key shuffling step according to an embodiment of the invention. The protocol uses a cryptographic mix network. The mix network may be constructed through a sequence of shuffles, where each shuffle of a list of verification/public keys $pk_1, \ldots, pk_N$ is a re-randomized new list of verification/public keys $pk_1', \ldots, pk_N'$ in a permuted order.

According to this embodiment, m random nodes are selected that will act as mix servers or in other words mixers, taking turns in mixing all node identities. By taking m large enough so that one can expect that at least one of the chosen mix servers is honest, an adversary will not be able to track identities through the mixing process.

More particularly, for the illustrated example of FIG. 9 it is assumed that the underlying network comprises a plurality of n network nodes, wherein the n network nodes comprise permanent node identities $pnid_1, \ldots, pnid_n$. The permanent node identities $pnid_1, \ldots, pnid_n$ are embodied as public keys/permanent verification keys of a public key signature scheme, wherein $$pnid_1 = g^{sk_1}, pnid_2 = g^{sk_2}, \ldots, pnid_n = g^{sk_n};$$

wherein g is a base of a group, in particular of an elliptic curve group, and $sk_1, sk_2, \ldots sk_n$ are the corresponding secret keys/signature keys.

The key shuffling step comprises a step of electing, by the plurality of permanent node identities $pnid_1, \ldots, pnid_n$ a plurality of mixers $M_1, M_2, \ldots, M_m$ as a subset of the permanent node identities. The plurality of mixers $M_1, M_2, \ldots, M_m$ are arranged at a specified order from 1 to m.

The first mixer $M_1$ receives as input list the permanent verification keys of the plurality of permanent node identities $pnid_1, \ldots, pnid_n$. It then chooses a secret exponent $r_1$ and performs a re-randomization of the input list by means of the secret exponent $r_1$ as follows:

$$pk_{1,1} = pk_{\pi_1(1)}^{r_1}, pk_{1,2} = pk_{\pi_1(2)}^{r_1}, \ldots, pk_{1,n} = pk_{\pi_1(n)}^{r_1}$$

Furthermore, it performs a permutation $\pi_1$ of the re-randomized input list, computes $R_1 = g^{r_1}$ and computes a zero-knowledge proof $ZKP(r_1, \pi_1)$ proving that the re-randomization and the permutation has been computed correctly.

The re-randomization and permutation step is then subsequently performed by all of the other mixers $M_2, \ldots, M_m$, wherein each subsequent mixer receives as input list the output list of the previous mixer. Additionally, each mixer computes a publicly verifiable proof of shuffle showing that the randomization and permutation were performed correctly. The proof is published on chain together with the list of re-randomized keys and the commitment of the randomness used. The soundness of the proof of shuffle guarantees that it is unfeasible for a misbehaving mixer to compute an accepting proof.

The output list of the last mixer of the specified order establishes then the plurality of blinded nodeidentities. In this example, the last mixer $M_m$ outputs the blinded node identities $bnid_1, \ldots, bnid_n$ as follows:

$$bnid_1 = pk_{m-1,\pi_m(1)}^{r_m}, \ldots, bnid_n = pk_{m-1,\pi_m(n)}^{r_m},$$

wherein $bnid_1 = R_m^{sk_{\pi(n)}}$ and $bnid_n = R_m^{sk_{\pi(n)}}$.

In addition, the last mixer $M_m$ computes the zero knowledge proof $ZKP(r_m, \pi_m)$ and adds it to the output list.

The plurality of mixers comprises a predefined minimum number m of mixers. The minimum number m of mixers is taken large enough so that one can expect that at least one of the chosen mixers is honest. According to embodiments, a minimum number m of 20, 50 or 100 mixers may be chosen.

According to embodiments, further key-shuffling/mixing steps may use the plurality of blinded node identities as input and accordingly elect by the plurality of blinded node identities that have been computed in a previous epoch a plurality of mixers as a subset of the blinded node identities.

Embodiments of the invention may use a broadcast communication channel that proceeds in rounds, so that each participant has the opportunity to provide an input in each round. At the end of every round, all participants receive all inputs provided during that round.

According to embodiments, a blockchain may be used as communication channel. According to embodiments, each round of the channel corresponds to a sequence of finalized blocks that is long enough so that at least one of the blockmakers must have been honest.

According to embodiments, the key shuffle step as illustrated in FIG. 9 is associated with a subsequent identity revealing step during which the link between the permanent node identities and their current blinded node identities must be disclosed.

According to embodiments the identity revealing step may use a threshold decryption committee. More particularly, in a new epoch, the first time a user uses his new blinded node identity, the protocol may require him to publish also a threshold encryption of his permanent node identity, together with a proof of consistency of his blinded node identity. At the end of an epoch, the committee could simply publish the secret key associated with the threshold decryption scheme. In case a blinded node identity has misbehaved during the epoch, the associated permanent node identity can be recovered and punished.

Figure 10:
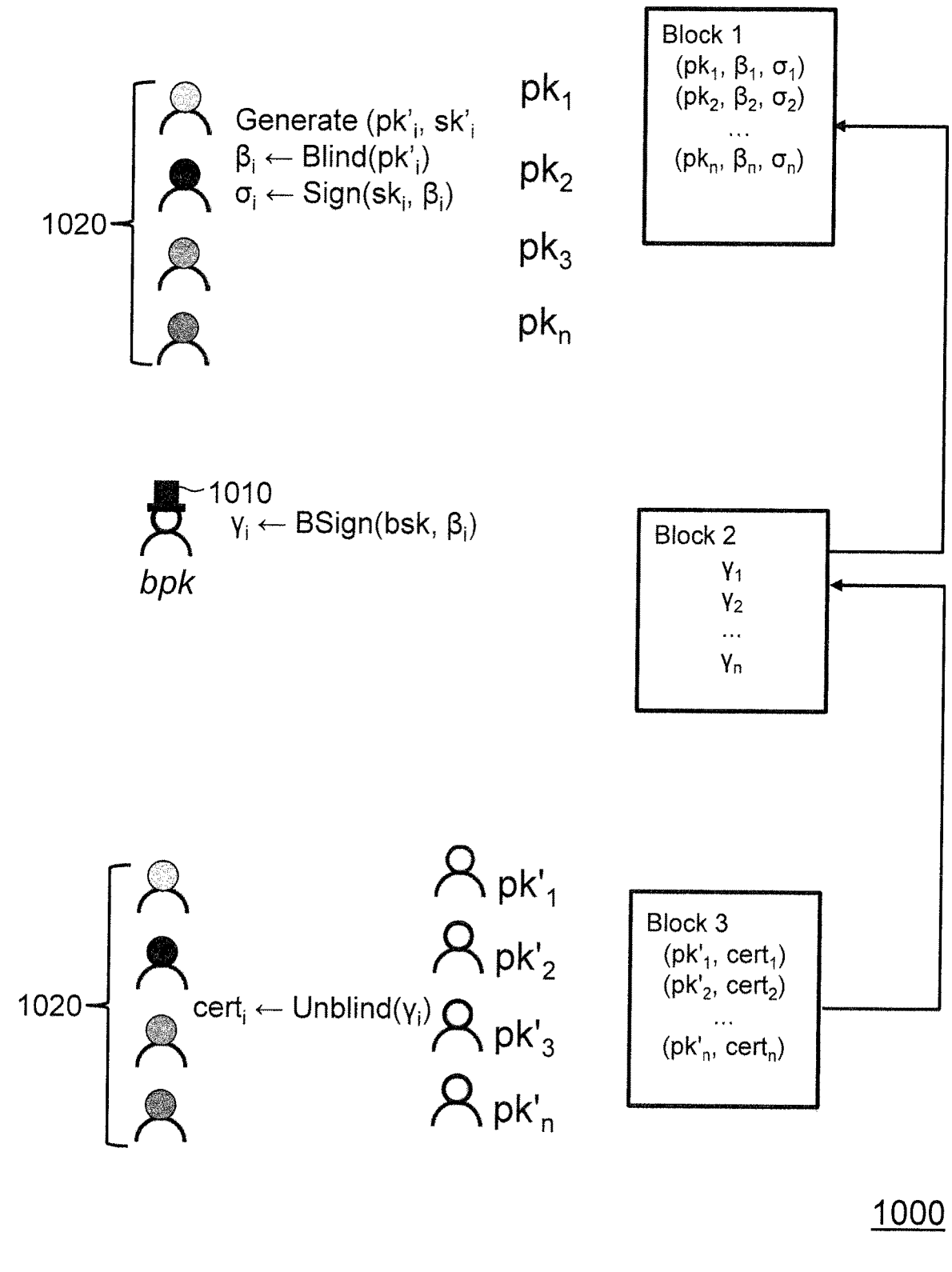
FIG. 10 shows a high-level illustration of another protocol for performing the key shuffling step according to an embodiment of the invention based on blind signatures.

FIG. 10 shows a high-level illustration of another protocol for performing the key shuffling step according to an embodiment of the invention.

The key shuffling protocol as illustrated in FIG. 10 is based on blind signatures. According to embodiments, Boldyreva's blind signatures may be used as disclosed in Boldyreva A. (2003), Threshold Signatures, Multisignatures and Blind Signatures Based on the Gap-Diffie-Hellman-Group Signature Scheme, Desmedt Y. G. (eds) Public Key Cryptography—PKC 2003. PKC 2003. Lecture Notes in Computer Science, vol 2567. Springer, Berlin, Heidelberg.

Boldyreva's blind signatures are a blind variant of BLS signatures as described in Boneh, D., Lynn, B. & Shacham, H. J Cryptology (2004) 17: 297, https://doi.org/10.1007/s00145-004-0314-9.

However, it should be noted that the protocol of FIG. 10 may be generally applied to any blind signature scheme that has the additional property that, given the transcript of a blind signing protocol, anyone can check whether the signer misbehaved.

On a very high level, according to the protocol of this embodiment every node obtains a blindly signed certificate on a freshly generated public key which is then used as the blinded node identity.

At the start of the key-shuffling step, a trusted party 1010 is randomly selected as blind signer of the certificates, identified by his current blinded verification/blinded public key bpk of his blinded node identity bnid. The blind signer generates a fresh BLS key pair and posts the public key on the chain, signed under his bnid.

A plurality of n nodes 1020 have permanent node identities comprising public keys $pk_1, \ldots, pk_n$. At a first step, the plurality of n nodes generate a fresh signature key pair $(pk_i', sk_i')$ and use the verification key/public key $pk_i'$ to be their new blinded node identity $bnid_i'$.

They then perform an on-chain execution of the blind BLS signature protocol using $bnid_i'$ as the message, whereby they authenticate their first move $\beta_i = H(bnid_i')^r$ of the blind signature protocol by signing it with their permanent node identity $pnid_i$.

The blind signer 1010 verifies that all first moves are correctly signed by a registered permanent node identity pnid, and that each pnid authenticates at most one first move. PNIDs that posted multiple first moves are penalized and excluded from the protocol.

The blind signer 1010 performs then a blind signature BSign for all valid requests, signed with his current bnid and posts them on the chain.

In case the blind signer 1010 misbehaves by posting an incorrect response or not posting any response to a valid request $\beta_i$, then the blind signer 1010 is penalized and the nodes restart the protocol with a new blind signer.

All nodes then compute their blinded node identity certificate $cert_i$ by unblinding $\gamma_i$ and they post $(bnid_i'; cert_i)$ to the chain.

If more valid pairs $((bnid_i'; cert_i)$ are posted to the chain than the number of valid requests $\beta_i$ were posted to the chain earlier, then the blind signer 1010 is penalized and the protocol is repeated with a new blind signer. Otherwise, the $bnid_i'$ from the valid pairs are used as the new blinded node identities.

Figure 11:
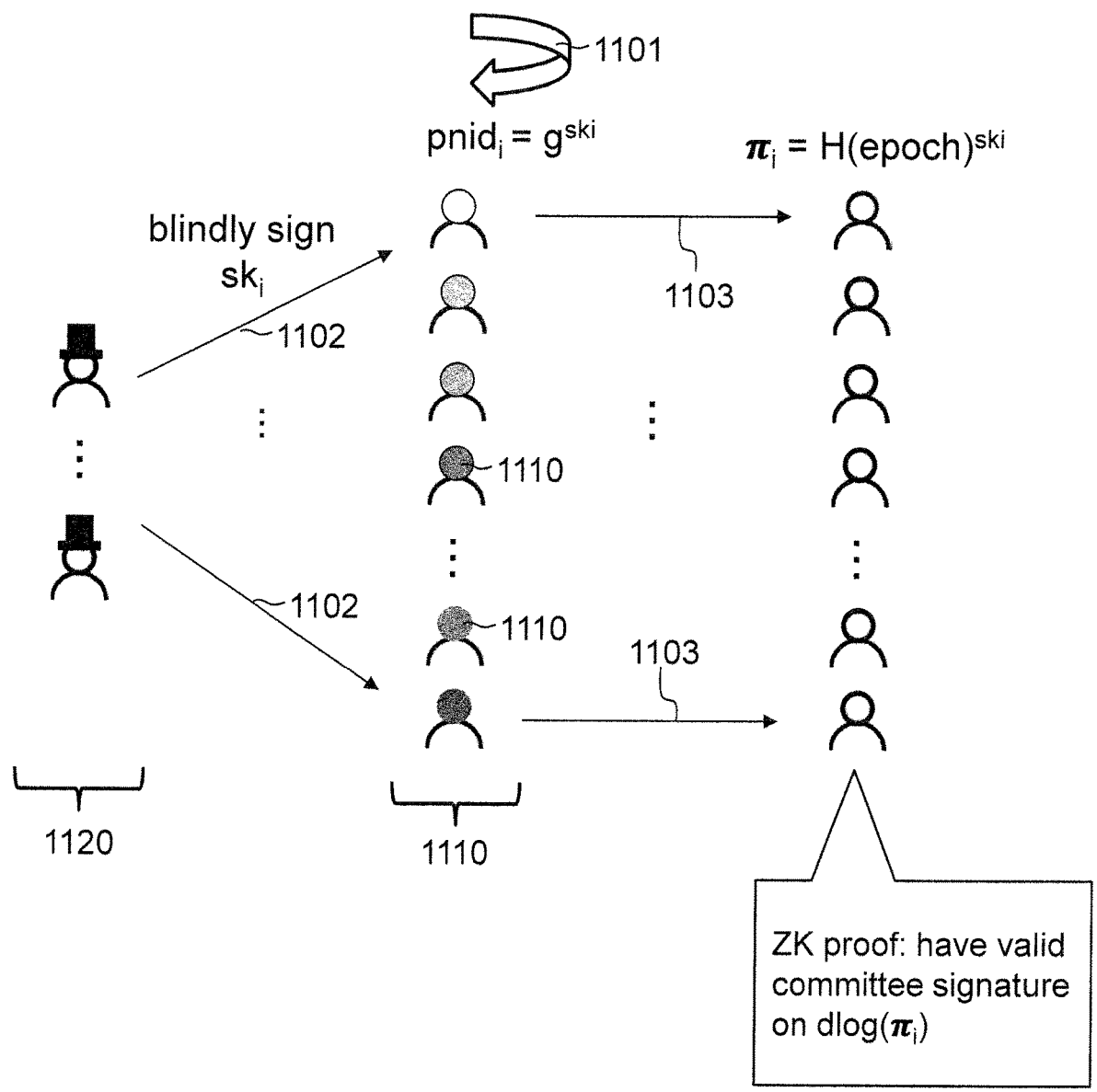
FIG. 11 shows a high-level illustration of another protocol for performing the key shuffling step according to an embodiment of the invention using threshold Pointcheval-Sanders signatures.

FIG. 11 shows a high-level illustration of another protocol for performing the key shuffling step according to an embodiment of the invention. The protocol shown in FIG. 11 uses a threshold group signature scheme with attributes, as can for example be derived from the Pointcheval-Sanders signature scheme as disclosed e.g. in David Pointcheval, Olivier Sanders, Short Randomizable Signatures, Kazue Sako, The Cryptographers' Track at the RSA Conference 2016, February 2016, San Francisco, United States. Springer Verlag, CT-RSA 2016, LNCS (9610), pp. 111-126, 2016.

In a group signature scheme, a group manager issues credentials to group members, who then use these credentials to sign messages. The signatures are such that nobody except a dedicated opening authority can tell which group member signed the message.

In a threshold group signature scheme, the roles of group manager and opening authority are distributed over an issuance committee and an opening committee, a threshold of whom must collaborate to issue a credential or to reveal who created a certain signature, respectively.

A threshold group signature scheme with attributes additionally enables the issuance committee to bind the issued credential to an attribute that the group member may or may not reveal when signing a message.

FIG. 11 depicts how a key shuffle can be built from a threshold group signature with attributes. In a first step 1101, all nodes 1110 of the network (depicted in the middle of the figure) generate their permanent node identities as $pnid_i=g^{sk_i}$.

In a second step 1102, an issuance committee 1120 (depicted on the left of the figure) then blindly issues credentials to all nodes with an attribute that is equal to their secret key $sk_i$, meaning that each node obtains a credential for attribute $sk_i$, but the issuance committee 1120 doesn't learn $sk_i$ in the process.

In a third step 1103, depicted on the right in the figure, each node 1110 publishes a unique pseudonym $\pi_i=H(epoch)^{sk_i}$, where H is a hash function and epoch is the sequence number of the epoch when the blinded identities have to become active, and uses its credential on $sk_i$ to publish a signature on the pseudonym $\pi_i$ and a zero-knowledge proof that $\pi_i=H(epoch)^{sk_i}$ was correctly computed for the value of $sk_i$ that is embedded as an attribute in the credential.

Note that the pseudonym $\pi_i$ is uniquely derived from the secret key $sk_i$, but for anyone who only knows the permanent node identity $pnid_i=g^{sk_i}$ but not the secret key $sk_i$, it is cryptographically impossible to determine which pseudonym corresponds to which permanent node identity.

In a further step, each node 1110 may according to embodiments either directly use the pseudonym $\pi_i$ as its blinded node identity $bnid_i$, or it may generate a fresh signature key pair, may set the public verification key to be its blinded node identity $bnid_i$, and may publish $bnid_i$ together with a zero-knowledge proof that it knows the secret key $sk_i$ underlying the pseudonym $\pi_i$.

Figure 12:
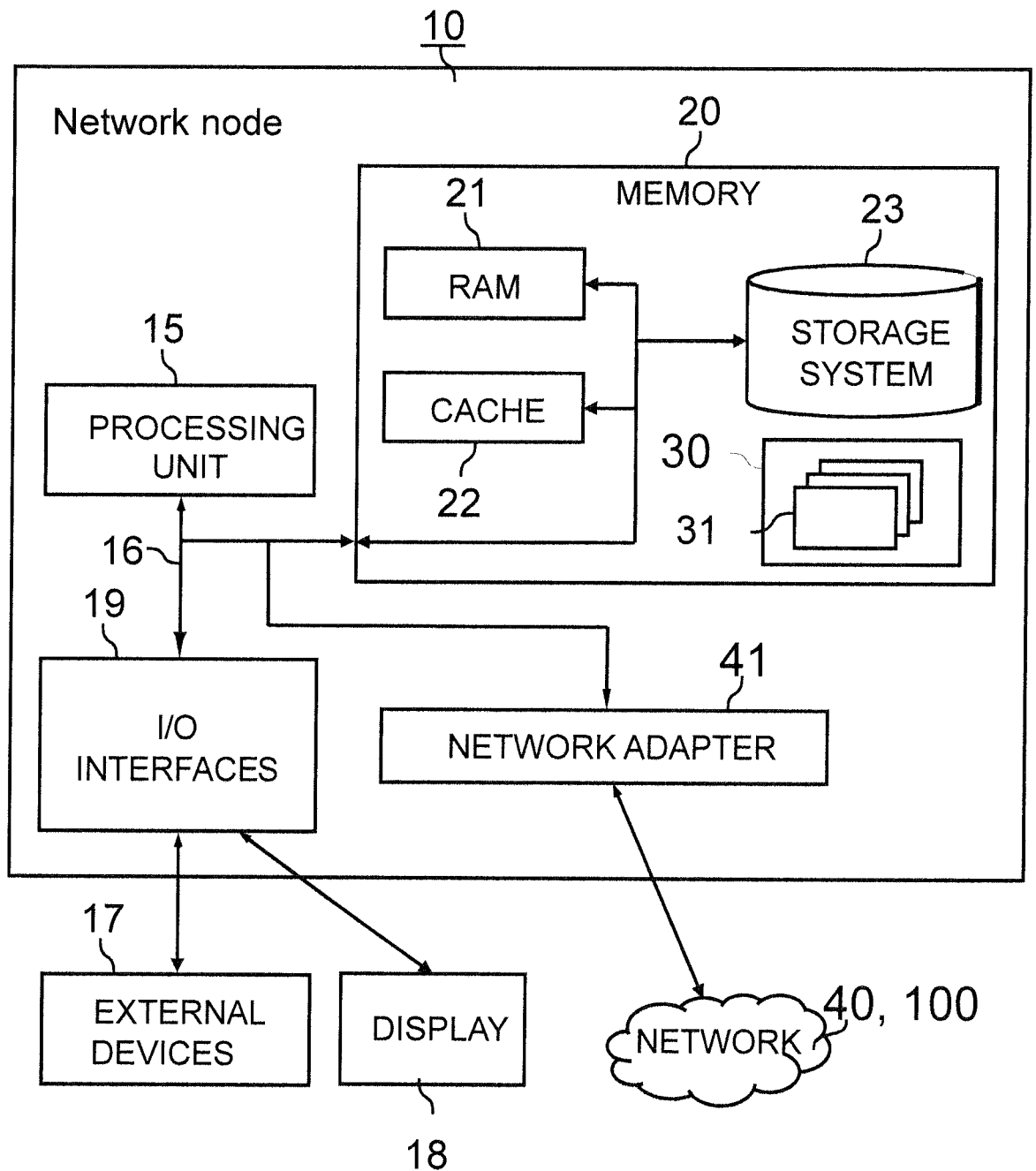
FIG. 12 shows an exemplary embodiment of a network node according to an embodiment of the invention.

Referring now to FIG. 12, a more detailed block diagram of a network node 10 according to embodiments of the invention is shown, e.g. of the network 100 of FIG. 1 The network node 10 establishes a computing node that may perform computing functions and may hence may be generally embodied as computing system or computer. The network node 10 may be e.g. a server computer. The network node 10 may be configured to perform a computer-implemented method for performing a consensus protocol, in particular a proof-of-stake consensus protocol of a blockchain network. The network node 10 may be operational with numerous other general purpose or special purpose computing system environments or configurations.

The network node 10 may be described in the general context of computer system-executable instructions, such as program modules, being executed by a computer system. Generally, program modules may include routines, programs, objects, components, logic, data structures, and so on that perform particular tasks or implement particular abstract data types. The network node 10 is shown in the form of a general-purpose computing device. The components of network node 10 may include, but are not limited to, one or more processors or processing units 15, a system memory 20, and a bus 16 that couples various system components including system memory 20 to processor 15.

Bus 16 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Network node 10 typically includes a variety of computer system readable media. Such media may be any available media that is accessible by network node 10, and it includes both volatile and non-volatile media, removable and non-removable media.

System memory 20 can include computer system readable media in the form of volatile memory, such as random access memory (RAM) 21 and/or cache memory 22. Network node 10 may further include other removable/non-removable, volatile/non-volatile computer system storage media. By way of example only, storage system 23 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 16 by one or more data media interfaces. As will be further depicted and described below, memory 20 may include at least one computer program product having a set (e.g., at least one) of program modules that are configured to carry out the functions of embodiments of the invention.

Program/utility 30, having a set (at least one) of program modules 31, may be stored in memory 20 by way of example, and not limitation, as well as an operating system, one or more application programs, other program modules, and program data. Each of the operating system, one or more application programs, other program modules, and program data or some combination thereof, may include an implementation of a networking environment. Program modules 31 generally carry out the functions and/or methodologies of embodiments of the invention as described herein. Program modules 31 may carry out in particular one or more steps of a computer-implemented method for performing a consensus protocol in a distributed network, e.g. of one or more steps of the methods as described above.

Network node 10 may also communicate with one or more external devices 17 such as a keyboard or a pointing device as well as a display 18. Such communication can occur via Input/Output (I/O) interfaces 19. Still yet, network node 10 can communicate with one or more networks 40 such as a local area network (LAN), a general wide area network (WAN), and/or a public network (e.g., the Internet) via network adapter 41. According to embodiments the network 40 may be in particular a distributed network comprising a plurality of network nodes 10, e.g. the network 100 as shown in FIG. 1. As depicted, network adapter 41 communicates with the other components of network node 10 via bus 16. It should be understood that although not shown, other hardware and/or software components could be used in conjunction with network node 10.

Figure 13:
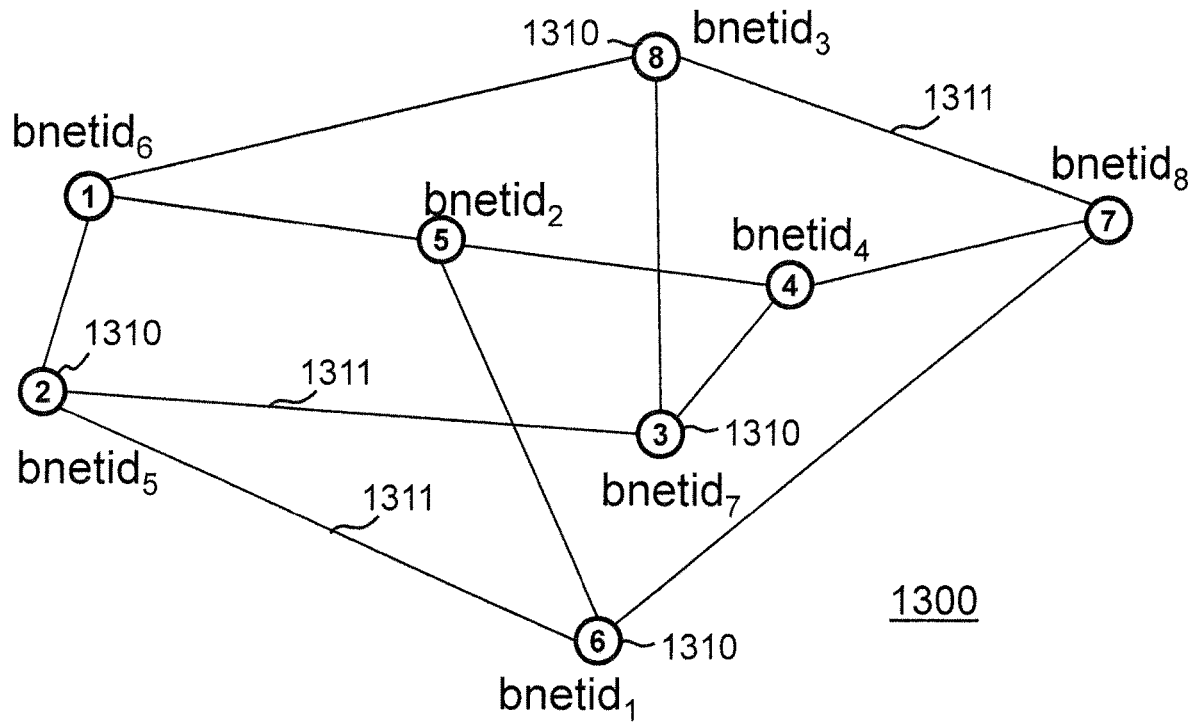
FIG. 13 shows a gossip graph according to an embodiment of the invention.

FIG. 13 shows a gossip graph 1300 according to an embodiment of the invention. The gossip graph may model a distributed network and comprises vertices 1310 and edges 1311. The gossip graph 1300 is embodied as a 3-regular graph. Accordingly, each vertex has 3 neighbors. The exemplary gossip graph 1300 comprises 8 vertices numbered from 1 to 8. A blinded network identity $bnetid_i$ is mapped randomly to each of the vertices 1 to 8 of the graph. Such a mapping may be in particular performed after a key-shuffle step.

Information between the vertices 1310 may be disseminated by means of a gossip protocol.

More particularly, each vertex/node can look up the bnetids of its neighbors. As an example, vertex 3 with blinded network identity $bnetid_7$ has gossip neighbors 2, 4 and 8 with blinded network identities $bnetid_5$, $bnetid_4$ and $bnetid_3$, respectively.

As an example for the communication between vertex 3 and vertex 2, vertex 3 may encrypt its network address (IP address) with the network encryption key of the blinded network identity $bnetid_5$ of vertex 2, sign the encrypted network address with its own network signature key of the blinded network identity $bnetid_7$ and provide its signed and encrypted network address to vertex 2.

Figure 14:
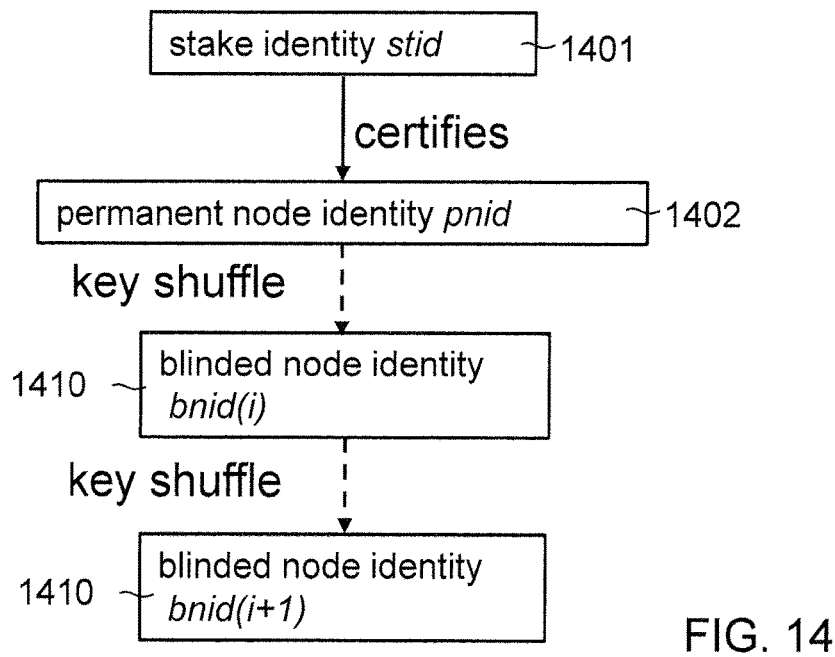
FIG. 14 shows a node identity structure of network nodes of a network according to another embodiment of the invention.

FIG. 14 shows a node identity structure 1400 of network nodes of a network according to an embodiment of the invention, e.g. of the network 100 as shown in FIG. 1.

The node identity structure corresponds partly to the node identity structure 400 of FIG. 6 and comprises a stake identity stid, 1401, a permanent node identity 1402, pnid and blinded node identities bnid, 1410.

In contrast to the node identity structure of FIG. 4, the node identity structure of FIG. 14 performs as a further key shuffle step an unlinkable one-to-one mapping between the plurality of blinded node identities bnid(i) that have been generated in a previous key shuffling step and a plurality of further blinded node identities bnid(i+1). In other words, after the first key shuffling step that has performed a shuffling from the permanent node identities, the further key shuffling step uses the blinded node identities of the previous key shuffling step as input.

Aspects of the present invention may be embodied as a system, in particular a network for performing a consensus protocol, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

Aspects of the present invention are described herein with reference to flowchart illustrations and/or block diagrams of methods, networks, apparatus (systems), and computer program products according to embodiments of the invention.

Computer readable program instructions according to embodiments of the invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of networks, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

In the following section we disclose further cryptographic details according to embodiments of the invention, in particular further cryptographic details of the exemplary key-shuffling protocols that have been described above with reference to FIGS. 9-11.

At first, we recall some basic definitions and constructions.

Let G be a multiplicative group of prime q, where q is a prime of bitlength k (e.g., k=256), and let g be a generator of the group G.

Threshold encryption allows a set of n participants to agree on a common encryption public key $pk=g^x$ so that none of them knows the actual decryption key x, but any subset of t or more of the n participants can jointly decrypt ciphertexts.

The keys may be in particular generated using a distributed key generation procedure as disclosed e.g. in Rosario Gennaro, Stanislaw Jarecki, Hugo Krawczyk, Tal Rabin: Secure Distributed Key Generation for Discrete-Log Based Cryptosystems. J. Cryptology 20(1): 51-83, 2007. At the end of this procedure, each participant i=1, . . . , n obtains a secret share $s_i = p(i) \mod q$, where $p(X)=x+a_1 X+ \ldots +a_{t-1} X^{t-1}$ is a polynomial with random coefficients x, $a_1, \ldots, a_{t-1}$. All participants obtain the public key $pk=g^x$ as well as values $B_1 = g^{a_1}, \ldots, B_{t-1} = g^{a_{t-1}}$.

To encrypt a message m∈G, one chooses a random value r from $Z_q$ and returns $C=(g^r, X^r \cdot m)$.

To decrypt a ciphertext $C=(C_1, C_2)$, participant i computes $R_i = C_1^{s_i}$ and creates a zero-knowledge proof $$ZKP\{(s_i): R_i = C_1^{s_i} \text{ and } g^{s_i} = \pi_{k=1, \ldots,} B_k^{i^k}\}$$

and publishes $R_i$ and the zero-knowledge proof. As soon as at least t values with valid proofs are published, all can compute $$pk^r = \pi R_i^{\lambda_i(0)}$$

where $$\lambda_i(X) = \pi_{j \neq i} (X-j)/(i-j) \mod q$$

and output $$m = C_2 / pk^r.$$

In the following, detailed embodiments of the protocol based on mixers as illustrated in FIG. 9 are given. Mixers may also be denoted as mix servers.

Protocols according to embodiments of the invention may use in particular a non-interactive zero-knowledge proof system that proves the correctness of a key shuffle. Each mixer $M_\tau$ receives as input $(R_{\tau-1}, pk_{\tau-1,1}, \ldots, pk_{\tau-1,N})$ from the previous mixer and returns $(R_\tau := R_{\tau-1}^r, pk_{\tau,1}, \ldots, pk_{\tau,N})$ together with a proof attesting that the output keys are a shuffle of the ones in the input. More precisely, mixer $M_\tau$ provides a proof for the following relation:

$$\mathcal{R}_{Sh} = \left\{ \begin{array}{l} (u, w) = \left( (\{pk_{\tau-1,i}\}_{i \in [N]}, \{pk_{\tau,j}\}_{j \in [N]}, R_{\tau-1}, R_\tau), (r, \pi) \right): \\ pk_{\tau,i}, pk_{\tau,j}, R_{\tau-1}, R_\tau \in \mathbb{G}, \ r \in \mathbb{Z}_q, \ \pi \in \sum_N, \\ R_\tau = R_{\tau-1}^r \quad pk_{\tau-1,i}^r = pk_{\tau,\pi(i)} \end{array} \right\}$$

where $[N]=\{1, \ldots, \mathbb{N}\}$ and $\Sigma_N$ is the set of all permutations over $[N]$. We refer to the proof generation algorithm of this relation as $\text{PROVER}_{Sh}$ and to the verification algorithm as $\text{VERIFIER}_{Sh}$.

Setup. First, all nodes agree on any setup parameters (e.g., common reference strings or hash functions) that are needed for the proof of shuffle $\mathcal{R}_{Sh}$.

Let the permanent node identities be given by public keys $pk_1, \ldots, pk_N$ such that $pk_i = g^{sk_i}$. Associated to his public key pk, each node includes a self-signed certificate of the form $\text{cert}_i = (h_i, c_i, s_i)$ that is computed as $$h_i \leftarrow H_0(pk_i)^{sk_i}$$

$$\rho_i \leftarrow_R \mathbb{Z}_q$$

$$t_{i,1} \leftarrow g^{\rho_i}; t_{i,2} \leftarrow H_0(pk_i)^{\rho_i}$$

$$c_i \leftarrow H_1(g, pk_i, H_0(pk_i), h_i, t_{i,1}, t_{i,2})$$

$$s_i \leftarrow \rho_i + c_i \cdot sk_i \mod q$$

The certificate is verified by checking that $$c_i = H_1(g, pk_i, H_0(pk_i), h_i, g^{s_i} \cdot pk_i^{-c_i}, H_0(pk_i)^{s_i} \cdot h_i^{-c_i}).$$

According to embodiments, the nodes agree on a selection of mixers $M_1, \ldots, M_m$ chosen randomly from the pool of nodes.

The number of mixers should be such that the probability that all chosen mixers are corrupt is negligible. The mixers could be chosen based on the output of a common random beacon, or according to preferred embodiments, the block proposers for particular block heights could be designated to act as mixers.

The nodes also agree on a subset of protocol participants of a consensus protocol that form an opening committee.

The members of the opening committee perform a distributed key generation protocol to jointly generate a t-out-of-n threshold public key $pk_e = g^{sk_e}$ so that each member has a secret share of the corresponding secret key $sk_e$. Here, n and t are chosen such that there is a negligible probability that t or more of the n members are corrupt, and such that one can safely assume that t of the n members will be available to participate in the revealing protocol when required.

Mixing. Each mix server/mixer will re-randomize and randomly permute the list of public keys that it receives from the previous mix server.

More particularly, the input of the first mix server $M_1$ is the list of long-term node identities $(pk_1, \ldots, pk_N)$, and the input of the τ-th mix server contains $(R_{\tau-1}, pk_{\tau-1,1}, \ldots, pk_{\tau-1,N})$ produced by $M_{\tau-1}$. Letting $R_0 \leftarrow g$ and $pk_{0,i} \leftarrow pk_i$, server $M_\tau$ proceeds as follows:

$$M_\tau(R_{\tau-1}, pk_{\tau-1,1}, \ldots, pk_{\tau-1,N}): r_\tau, \rho_\tau \leftarrow_R \mathbb{Z}_q$$

$$R_\tau \leftarrow R_{\tau-1}^{r_\tau}$$

$$h_\tau \leftarrow H_0(R_\tau)^{r_\tau}$$

$$t_{\tau,1} \leftarrow R_{\tau-1}^{\rho_\tau}; t_{\tau,2} \leftarrow H_0(R_\tau)^{\rho_\tau}$$

$$c_\tau \leftarrow H_1(R_{\tau-1}, R_\tau, H_0(R_\tau), h_\tau, t_{\tau,1}, t_{\tau,2})$$

$$s_\tau \leftarrow \rho_T + c_\tau \cdot r_\tau \mod q$$

Choose a random permutation $\tau_\tau$ over $\{1, \ldots, N\}$
For $j=1, \ldots, N$ do $pk_{\tau,j} \leftarrow pk_{\tau-1, \tau_\tau(j)}^{r_\tau}$ $$\pi_{Sh,\tau} \leftarrow_R \text{PROVER}_{Sh}((\{pk_{\tau-1,i}\}_{i \in [N]}, \{pk_{\tau,i}\}_{i \in [N]}, R_{\tau-1}, R_\tau), (r_\tau, \pi_\tau))$$

Sign and broadcast $(R_\tau, h_\tau, c_\tau, s_\tau, \pi_{Sh,\tau}, pk_{i,1}, \ldots, pk_{i,N})$ Verification. After each round of mixing, the block proposer and/or notarizers verify the output of the last mix server $(R_\tau, h_\tau, c_\tau, s_\tau, \pi_{Sh,\tau}, pk_{\tau,1}, \ldots, pk_{\tau,N})$ by checking that $\text{VERIFIER}_{Sh}((\{pk_{\tau-1,i}\}_{i \in [N]}, \{pk_{\tau,i}\}_{i \in [N]}, R_{\tau-1}, R_\tau), \pi_{Sh})=1$ and that $$c_\tau = H_1(R_{i-1}, R_\tau, H_0(R_\tau), h_\tau, R_{i-1}^{s_\tau} \cdot R_\tau^{-c_\tau}, H_0(R_\tau)^{s_\tau} \cdot h_\tau^{-c}).$$

If any of these check fails, then this mixing round may be deemed invalid. At this point, according to embodiments one could either ignore the output of this mixer and let the (τ+1)st mixer proceed on the output of the (τ−1)st mixer $(R_{\tau-1}, pk_{\tau-1,1}, \ldots, pk_{\tau-1,N})$, or according to other embodiments one could choose a new protocol participant to take up the role of $M_\tau$ until a valid round of mixing has been performed.

Final output. Let $(R_m, h_m, c_m, s_m, \pi_{Sh,m}, pk_{m,1}, \ldots, pk_{m,N})$ be the output of the last mixing server $M_m$. If we let $g' \leftarrow R_m$ and let $(pk'_1, \ldots, pk'_N) \leftarrow (pk_{m,1}, \ldots, pk_{m,N})$, then for each protocol participant with original public key $pk_i = g^{sk_i}$, there will be exactly one public key $pk'j = g'^{sk_i}$ in the final output.

Signing. The node may take $pk'_j$ as its new blinded node identity (BNID), using it to create Schnorr signatures using $g'$ as generator, rather than $g$.

The first time that a protocol participant creates a signature with its new BNID, however, it adds according to embodiments a verifiable encryption under $pk_e$ of its original key $pk_i$ while proving that it has the same secret key as $pk'_j$, i.e., $r, \rho_1, \rho_2 \leftarrow_R \mathbb{Z}_q$ $C_1 \leftarrow g^r$ $C_2 \leftarrow pk_e^r \cdot pk_i$ $t_1 \leftarrow g^{\rho_1}$ $t_2 \leftarrow pk_e^{\rho_1} \cdot g^{\rho_2}$ $t_3 \leftarrow g'^{\rho_2}$ $c \leftarrow H_1(C_1, g, C_2, pk_e, g, g', pk'_j, t_1, t_2, t_3)$ $s_1 \leftarrow \rho_1 + c \cdot r \bmod q$ $s_2 \leftarrow \rho_2 + c \cdot sk_i \bmod q$ Return $(C_1, C_2, c, s_1, s_2)$ Verification. Signatures under a public key $pk'_j$ may be verified as normal Schnorr signatures using generator $g'$. In a first signature of a protocol participant under the new key $pk'_j$, one may additionally check according to embodiments that the verifiable encryption is valid by checking that $c = H_1(C_1, g, C_2, pk_e, g, g', pk'_j, g^{s_1} C_1^{-c}, pk_e^{s_1} g^{s_2} C_2^{-c}, g'^{s_2} pk'^{-c}_j)$.

Reveal. When a protocol participant voluntarily wants to reveal the link between its old key $pk_i$ and its new key $pk'_j$, it may create a proof that both are based on the same secret key as follows:

$\rho \leftarrow_R \mathbb{Z}_q$ $t_1 \leftarrow g^\rho$ $t_2 \leftarrow g'^\rho$ $c \leftarrow H_1(pk_i, g, pk'_j, g', t_1, t_2)$ $s \leftarrow \rho + c \cdot sk_i \bmod q$ Return $(c, s)$ This proof can be verified by checking that $c = H_1(pk_i, g, pk'_j, g', g^s pk_i^{-c}, g'^s pk'^{-c}_j)$.

While there are shown and described presently preferred embodiments of the invention, it is to be distinctly understood that the invention is not limited thereto but may be otherwise variously embodied and practiced within the scope of the following claims.

The invention claimed is:

1. A distributed network comprising a plurality of network nodes, wherein
each of the plurality of network nodes is linked to a first node identity of a plurality of first node identities;
each of the plurality of first node identities comprises a first verification key of a public-key signature scheme;
the distributed network is configured to
perform a key shuffling step adapted to perform an unlinkable one-to-one mapping between the plurality of first node identities and a plurality of second node identities, wherein each of the plurality of second node identities comprises a second verification key of a public-key signature scheme; and
perform one or more steps of a consensus protocol with a subset of the plurality of second node identities,
wherein the key shuffling step comprises
electing, by the plurality of first node identities, a plurality of mixers as a subset of the first node identities, the plurality of mixers being arranged at a specified order;
receiving, by each mixer, an input list comprising a plurality of verification keys; and
computing, by each mixer, an output list comprising a permutation and re-randomization of the input list, wherein the computing uses a secret permutation and a secret re-randomization exponent,
wherein
a first mixer of the specified order receives, as the input list, the first verification keys of the plurality of first node identities, wherein the received first verification keys of the plurality of first node identities comprise permanent verification keys of permanent node identities,
each subsequent mixer of the specified order receives as the input list the output list of a previous mixer of the specified order, and
the output list of a last mixer of the specified order establishes the plurality of second node identities, wherein the plurality of second node identities comprises a plurality of blinded node identities.

2. The distributed network according to claim 1, wherein the distributed network is further configured to regularly repeat the key shuffling step.

3. The distributed network according to claim 1, wherein the distributed network is further configured to perform
an identity revealing step adapted to reveal the mapping between the plurality of first node identities and the plurality of second node identities after performing the consensus protocol.

4. The distributed network according to claim 1, wherein the distributed network is further configured to
perform a further key shuffling step adapted to perform an unlinkable one-to-one mapping between the plurality of second node identities and a plurality of third node identities, wherein each of the plurality of third node identities comprises a third verification key.

5. The distributed network according to claim 1, wherein
the distributed network is a proof-of-stake blockchain network;
the plurality of first node identities are permanent node identities;
each of the plurality of permanent node identities comprises as first verification key a permanent verification key;
the plurality of second node identities are a plurality of blinded node identities, wherein each of the plurality of blinded node identities comprises as second verification key a blinded verification key; and
the network is configured to perform as consensus protocol a proof-of-stake consensus protocol on transactions to be written on the blockchain network with a subset of the plurality of blinded node identities.

6. The distributed network according to claim 5, wherein the distributed network is further configured to
assign a network identity to each of the plurality of permanent node identities; and
certify the network identity by the corresponding permanent node identity.

7. The distributed network according to claim 6, wherein the distributed network identity further comprises a Transport Layer Security "TLS" certificate and a network address.

8. The distributed network according to claim 5, wherein the distributed network is further configured to
perform an unlinkable one-to-one mapping between the plurality of blinded node identities and a plurality of blinded network identities, wherein each of the plurality of blinded network identities comprises a network verification key and a network encryption key, in particular of a signature scheme and a public-key encryption scheme, respectively.

9. The distributed network according to claim 5, wherein the distributed network is further configured to
perform an unlinkable one-to-one mapping between the plurality of permanent node identities and a plurality of blinded network identities, wherein each of the plurality of blinded network identities comprises a network verification key and a network encryption key, in particular of a signature scheme and a public-key encryption scheme, respectively.

10. The distributed network according to claim 8, wherein the distributed network is further configured to
perform a gossip protocol to disseminate information between the network nodes; and
assign the plurality of blinded network identities to a plurality of vertices of a gossip graph so that each vertex can look up a network verification key of neighbours of the vertex.

11. The distributed network according to claim 10, wherein each vertex of the gossip graph is configured to
encrypt a network address of the vertex with the network encryption key of neighbours of the vertex;
sign the encrypted network address with a network signature key corresponding to a network verification key of the vertex; and
provide the signed and encrypted network address to the neighbours of the vertex.

12. The distributed network according to claim 1, wherein
each of the plurality of network nodes comprises a stake identity, the stake identity comprising a stake verification key of a public-key signature scheme; and
the network is configured to certify the first node identities by the corresponding stake identities.

13. The distributed network according to claim 1, wherein the distributed network is further configured to
elect members of a committee from the plurality of second node identities according to predefined election scheme;
perform the consensus protocol with the elected members of the committee.

14. The distributed network according to claim 13, wherein the elected members of the committee perform a distributed key generation protocol.

15. The distributed network according to claim 1, wherein the plurality of second node identities are assigned to a plurality of shards.

16. The distributed network according to claim 1, wherein the distributed network is further configured to perform a further key-shuffling step, the further key shuffling step comprising:
electing, by the plurality of second node identities, a plurality of mixers as a subset of the second node identities, the plurality of mixers being arranged at a specified order;
receiving, by each mixer, an input list comprising a plurality of verification keys;
computing, by each mixer, an output list comprising a permutation and re-randomization of the input list, wherein the computing uses a secret permutation and a secret re-randomization exponent,
wherein
a first mixer of the specified order receives, as the input list, the second verification keys of the plurality of second node identities, the second verification keys comprising permanent verification keys of a plurality of permanent node identities,
each subsequent mixer receives as the input list the output list of a previous mixer, and
the output list of a last mixer of the specified order establishes a plurality of third node identities comprising blinded node identities.

17. The distributed network according to claim 1, wherein the key shuffling step further comprises:
computing, by each mixer, a zero-knowledge proof proving that the re-randomization and the permutation has been computed correctly; and
adding, by each mixer, the zero-knowledge proof to the output list.

18. The distributed network according to claim 1, wherein the key shuffling step uses a blind signature scheme.

19. The distributed network according to claim 1, wherein the key shuffling step uses a Pointcheval-Sanders signature scheme.

20. A computer-implemented method for performing a consensus protocol in a distributed network comprising a plurality of network nodes, the distributed network comprising a proof-of-stake blockchain network, the method comprising:
linking each of the plurality of network nodes to a first node identity of a plurality of first node identities, wherein each of the plurality of first node identities comprises a first verification key;
performing a key shuffling step comprising performing an unlinkable one-to-one mapping between the plurality of first node identities and a plurality of second node identities, wherein each of the plurality of second node identities comprises a second verification key; and
performing the consensus protocol, the consensus protocol comprising a proof-of-stake consensus protocol, with a subset of the plurality of second node identities,
wherein the key shuffling step comprises
electing, by the plurality of first node identities, a plurality of mixers as a subset of the first node identities, the plurality of mixers being arranged at a specified order;
receiving, by each mixer, an input list comprising a plurality of verification keys; and
computing, by each mixer, an output list comprising a permutation and re-randomization of the input list, wherein the computing uses a secret permutation and a secret re-randomization exponent,
wherein
a first mixer of the specified order receives, as the input list, the first verification keys of the plurality of first node identities, wherein the received first verification keys of the plurality of first node identities comprise permanent verification keys of permanent node identities, each subsequent mixer of the specified order receives as the input list the output list of a previous mixer of the specified order, and the output list of a last mixer of the specified order establishes the plurality of second node identities, wherein the plurality of second node identities comprises a plurality of blinded node identities.

21. A non-transitory computer readable storage medium for operating a distributed network comprising a proof-of-stake blockchain network, the distributed network comprising a plurality of network nodes, the computer readable storage medium having program instructions embodied therewith, the program instructions executable by one or more of the plurality of network nodes to cause the one or more of the plurality of network nodes to perform a method comprising:

linking each of the plurality of network nodes to a first node identity of a plurality of first node identities, wherein each of the plurality of first node identities comprises a first verification key;

performing a key shuffling step comprising performing an unlinkable one-to-one mapping between the plurality of first node identities and a plurality of second node identities, wherein each of the plurality of second node identities comprises a second verification key; and performing a consensus protocol, the consensus protocol comprising a proof-of-stake consensus protocol, with a subset of the plurality of second node identities, wherein the key shuffling step comprises electing, by the plurality of first node identities, a plurality of mixers as a subset of the first node identities, the plurality of mixers being arranged at a specified order;

receiving, by each mixer, an input list comprising a plurality of verification keys; and computing, by each mixer, an output list comprising a permutation and re-randomization of the input list, wherein the computing uses a secret permutation and a secret re-randomization exponent, wherein a first mixer of the specified order receives, as the input list, the first verification keys of the plurality of first node identities, wherein the received first verification keys of the plurality of first node identities comprise permanent verification keys of permanent node identities, each subsequent mixer of the specified order receives as the input list the output list of a previous mixer of the specified order, and the output list of a last mixer of the specified order establishes the plurality of second node identities, wherein the plurality of second node identities comprises a plurality of blinded node identities.

* * * * *